(12) United States Patent
Dunker

(10) Patent No.: US 9,224,548 B2
(45) Date of Patent: Dec. 29, 2015

(54) DISCONNECT SWITCH INCLUDING FUSIBLE SWITCHING DISCONNECT MODULES

(75) Inventor: Jessica Ann Dunker, Edwardsville, IL (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 1122 days.

(21) Appl. No.: 13/183,554

(22) Filed: Jul. 15, 2011

(65) Prior Publication Data

US 2013/0015940 A1   Jan. 17, 2013

(51) Int. Cl.
| | | |
|---|---|---|
| H01H 3/02 | (2006.01) | |
| H01H 37/02 | (2006.01) | |
| H01H 9/10 | (2006.01) | |
| H02B 1/48 | (2006.01) | |

(52) U.S. Cl.
CPC ............... *H01H 9/104* (2013.01); *H01H 3/02* (2013.01); *H01H 37/02* (2013.01); *H02B 1/48* (2013.01)

(58) Field of Classification Search
CPC ......... H01H 9/104; H01H 37/02; H01H 3/02; H02B 1/48
USPC ............... 361/628, 629, 631, 632, 643, 656; 337/12, 142, 143
See application file for complete search history.

(56) References Cited

U.S. PATENT DOCUMENTS

| | | | | |
|---|---|---|---|---|
| 1,412,242 | A * | 4/1922 | Horton ........................ | 200/50.15 |
| 2,418,006 | A * | 3/1947 | Bangert, Jr. .................. | 200/330 |
| 2,654,011 | A * | 9/1953 | Kingdon ...................... | 218/1 |
| 2,924,688 | A * | 2/1960 | Edmunds ...................... | 337/7 |
| 3,632,935 | A * | 1/1972 | Stegmaier .................... | 200/571 |
| 3,939,725 | A * | 2/1976 | Fisher ......................... | 74/503 |
| 4,233,482 | A * | 11/1980 | DiMarco et al. ............... | 200/255 |
| 4,778,959 | A * | 10/1988 | Sabatella et al. ............... | 218/1 |
| 4,965,414 | A * | 10/1990 | Sobotka et al. ............ | 200/50.02 |
| 5,128,828 | A * | 7/1992 | Mrenna et al. ................ | 361/627 |
| 5,193,666 | A * | 3/1993 | Markowski et al. .......... | 200/331 |
| 5,286,935 | A * | 2/1994 | Mina et al. .................... | 200/330 |
| 5,295,849 | A * | 3/1994 | Jeffcoat et al. ............... | 439/266 |
| 5,319,168 | A * | 6/1994 | Hutko et al. .................. | 200/331 |
| 5,577,603 | A * | 11/1996 | Bogdanovs et al. ........... | 200/331 |
| 5,663,862 | A * | 9/1997 | Hopping-Mills ............. | 361/115 |
| 5,841,337 | A * | 11/1998 | Douglass ...................... | 337/198 |
| 5,973,279 | A * | 10/1999 | Turner et al. .................. | 200/331 |
| D427,569 | S | 7/2000 | Douglass et al. | |
| D427,976 | S | 7/2000 | Douglass et al. | |
| D429,223 | S | 8/2000 | Douglass et al. | |
| 6,157,287 | A | 12/2000 | Douglass et al. | |
| 6,192,781 | B1 * | 2/2001 | Thames et al. ................ | 91/30 |
| 6,423,913 | B1 * | 7/2002 | Gupta et al. ............... | 200/50.11 |

(Continued)

FOREIGN PATENT DOCUMENTS

| | | | | | |
|---|---|---|---|---|---|
| DE | 2155203 | A1 * | 5/1972 | ............... | H01H 9/10 |
| FR | 2658008 | A1 * | 8/1991 | ............. | H02B 1/052 |

*Primary Examiner* — Anatoly Vortman
(74) *Attorney, Agent, or Firm* — Armstrong Teasdale LLP

(57) ABSTRACT

A disconnect switch includes an enclosure containing a fusible switch disconnect assembly, and a switch mechanism and handle associated with the switch mechanism for opening and closing current paths in the fusible switch disconnect assembly. The fusible switch disconnect assembly may receive a plurality of retractable rectangular fuse modules having terminal blades. Switch contacts are provided in the fusible switch disconnect assembly and are positionable with rotary switch actuators, all of which may be operated via the handle and the switch mechanism.

61 Claims, 11 Drawing Sheets

(56) References Cited

U.S. PATENT DOCUMENTS

| | | |
|---|---|---|
| 6,696,969 B2 | 2/2004 | Torrez et al. |
| 6,784,783 B2 | 8/2004 | Scoggin et al. |
| 6,853,289 B2 | 2/2005 | Scoggin |
| 7,049,973 B2 | 5/2006 | Torrez et al. |
| 7,214,895 B2 * | 5/2007 | Houck et al. ............. 200/310 |
| 7,385,518 B2 | 6/2008 | Torrez et al. |
| 7,474,194 B2 | 1/2009 | Darr et al. |
| 7,495,540 B2 | 2/2009 | Darr et al. |
| 7,515,031 B2 * | 4/2009 | Jakobsen et al. ............. 337/187 |
| 7,561,017 B2 | 7/2009 | Darr et al. |
| 7,576,630 B2 | 8/2009 | Darr |
| 7,772,510 B2 * | 8/2010 | Manahan et al. ............. 200/50.02 |
| 7,855,873 B2 | 12/2010 | Darr et al. |
| 7,915,555 B2 * | 3/2011 | Schneider et al. ............. 200/331 |
| 8,514,551 B2 * | 8/2013 | Cosley et al. ............. 361/632 |
| 2007/0056835 A1 * | 3/2007 | Manahan et al. ............. 200/50.02 |
| 2007/0252670 A1 | 11/2007 | Darr |
| 2008/0158788 A1 * | 7/2008 | Darr et al. ............. 361/647 |

* cited by examiner

DISCONNECT SWITCH INCLUDING FUSIBLE SWITCHING DISCONNECT MODULES

CROSS REFERENCE TO RELATED APPLICATIONS

This application relates to subject matter disclosed in U.S. patent application Ser. No. 13/008,950 filed Jan. 19, 2011 and entitled Fusible Switching Disconnect Modules and Devices With In-Line Current Detection; U.S. patent application Ser. No. 13/008,988 filed herewith and entitled Fusible Switching Disconnect Modules and Devices with Tripping Coil; and U.S. patent application Ser. No. 13/009,012 filed Jan. 19, 2011 and entitled Fusible Switching Disconnect Modules and Devices with Multi-Functional Trip Mechanism.

BACKGROUND OF THE INVENTION

This invention relates generally to electrical switching devices, and more specifically to fusible disconnect switch devices.

Fuses are widely used as overcurrent protection devices to prevent costly damage to electrical circuits. Fuse terminals typically form an electrical connection between an electrical power source and an electrical component or a combination of components arranged in an electrical circuit. One or more fusible links or elements, or a fuse element assembly, is connected between the fuse terminals, so that when electrical current through the fuse exceeds a predetermined limit, the fusible elements melt and open one or more circuits through the fuse to prevent electrical component damage.

In some applications, fuses are employed not only to provide fused electrical connections but also for connection and disconnection, or switching, purposes to complete or break an electrical connection or connections. As such, an electrical circuit is completed or broken through conductive portions of the fuse, thereby energizing or de-energizing the associated circuitry. Typically, the fuse is housed in a fuse holder having terminals that are electrically coupled to desired circuitry. When conductive portions of the fuse, such as fuse blades, terminals, or ferrules, are engaged to the fuse holder terminals, an electrical circuit is completed through the fuse, and when conductive portions of the fuse are disengaged from the fuse holder terminals, the electrical circuit through the fuse is broken. Therefore, by inserting and removing the fuse to and from the fuse holder terminals, a fused disconnect switch is realized. Improvements, however, are desired.

DETAILED DESCRIPTION OF THE INVENTION

Advantageous embodiments of switch disconnect devices are described below including fusible switch disconnect devices of relatively compact size, yet offering substantial current interruption capability. This allows a smaller footprint for the switch than known disconnect switches having similar interruption capability. Further, the embodiments of switch disconnect devices are manufacturable at comparatively lower cost than known disconnects having similar interruption capability. Method aspects implementing advantageous features will be in part apparent and in part explicitly discussed in the description below.

Figure 1:
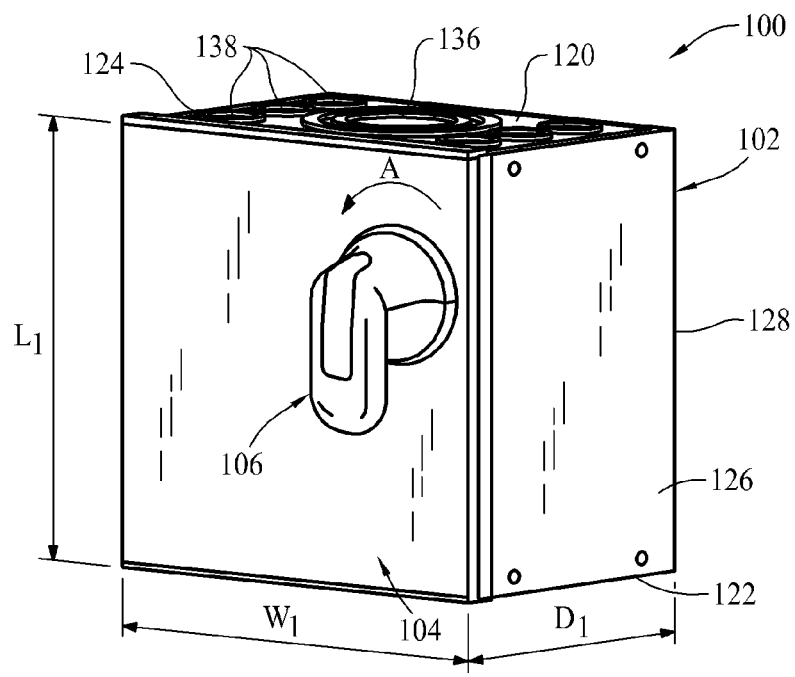
FIG. 1 is a front perspective view of a first embodiment of an exemplary disconnect switch.
Figure 2:
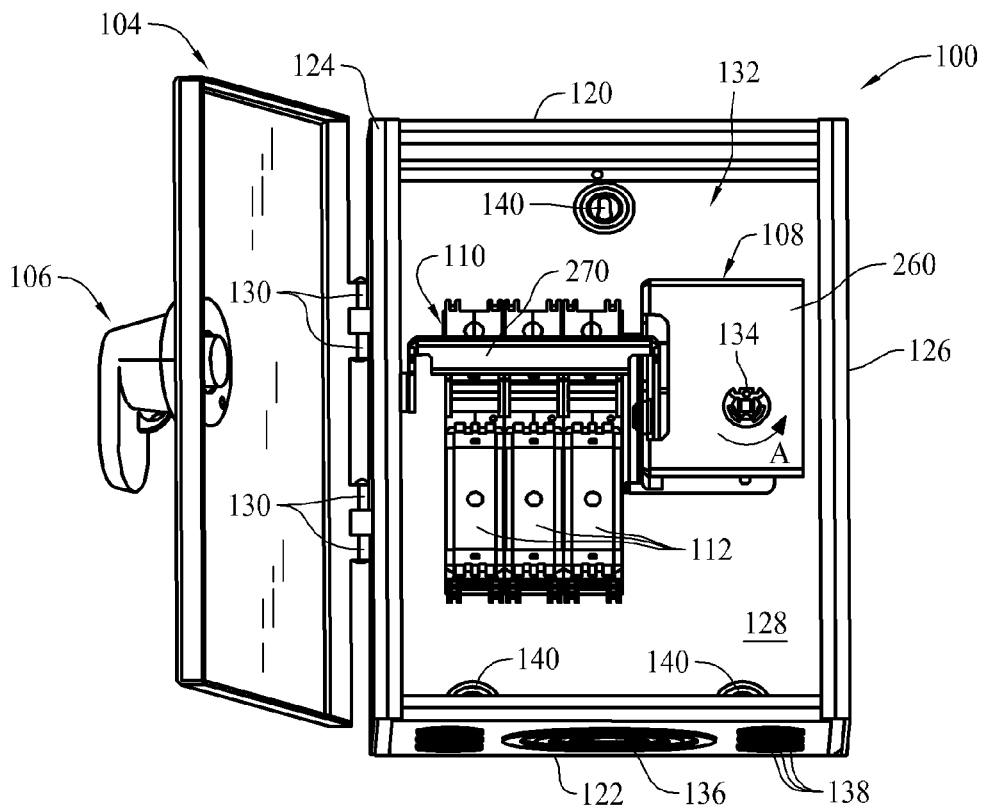
FIG. 2 is a front view of the switch shown in FIG. 1 with the door opened.
Figure 3:
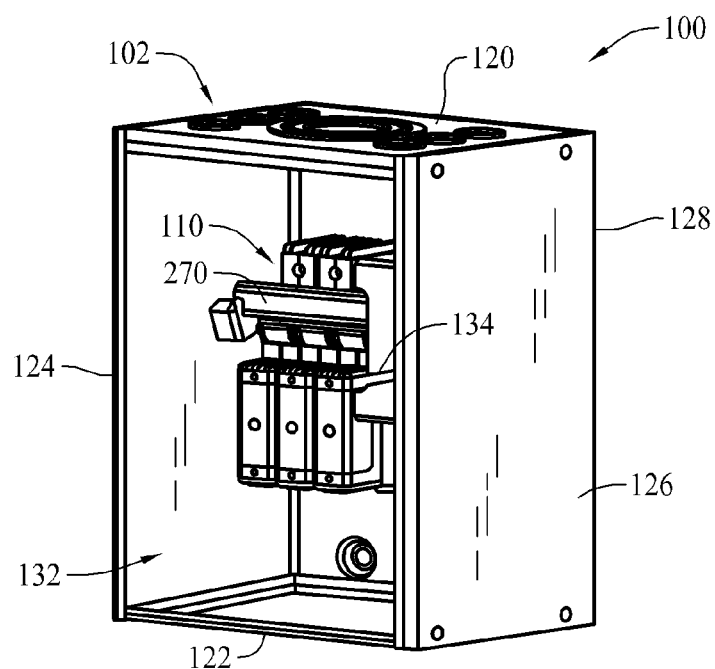
FIG. 3 is a side perspective view of the switch shown in FIGS. 1 and 2.

FIGS. 1-3 illustrate various views of an exemplary disconnect switch 100 generally including an enclosure 102 provided with an access door 104 positionable relative to the enclosure 102 between a closed position (FIG. 1) and an opened position (FIG. 2). FIG. 3 illustrates the enclosure 102 with the door 104 removed. The door 104 includes a switch handle actuator 106 rotatably mounted to the door 104 and extending exterior to the door 104, and the switch actuator handle 106 cooperates with a switch mechanism 108 mounted to the interior of the enclosure 102. The mechanism 108, in turn, operates to connect or disconnect current paths in a fusible switch disconnect assembly 110 including overcurrent protection fuses 112. In the embodiment shown, each fuse 112 completes a switchable current path in the fusible switch disconnect assembly 110, and the mechanism 108 simultaneously operates switch contacts to connect or disconnect each fuse 112 in the assembly using the single handle 106 provided on the enclosure 102. While three fuses 112 are shown, it is contemplated that more or less fuses 112 may be provided in the disconnect switch 100 to open or close various numbers of circuit paths through the fuses provided.

As shown in FIGS. 1-3, the enclosure 102 is generally rectangular and includes a top wall 120, a bottom wall 122 opposite the top wall 120, and side walls 124, 126 opposing one another and interconnecting the top and bottom walls 122, 124. A rear wall 128 is also provided and interconnects the edges of the top, bottom and side walls 120, 122, 124 and 126. A box-like enclosure having an interior cavity 132 is therefore defined by the walls 120, 122, 124, 126 and 128. The enclosure 102 forming the interior cavity 132 is generally open ended opposite the rear wall 128, however, and the door 104 is attached to the enclosure 102 in the example shown via hinge elements 130 at the side wall 124. The door 104 is pivotable about the hinge elements 130 between an open position (FIG. 2) allowing access to an interior cavity 132 formed by the enclosure 102 and a closed position (FIG. 1)

completing the enclosure 102. The enclosure 102 generally has, as shown in FIG. 1, a length dimension $L_1$, a width dimension $W_1$ and a depth dimension $D_1$.

In the exemplary switch 100, the switch mechanism 108 and the fusible switch disconnect assembly 110 are mounted in the interior cavity 132 of the enclosure 102. The switch mechanism 108 includes a shaft 134 slidably engageable with the handle 106 as the door 104 is closed. The shaft 134 is received in a slot or sleeve formed in the handle and accessible from the interior side of the door 104. When the handle 106 is rotated in the direction of arrow A (FIG. 1) while engaged to the shaft 134, for example, the shaft 134 is rotated in the same direction of arrow A and causes the switch mechanism 108 to open the current paths through the fusible switch disconnect assembly 110 and electrically isolate the fuses 112 from line side circuitry in an electrical power system. Likewise, by rotating the handle 104 in a direction opposite to arrow A, the shaft 134 is rotated therewith in the opposite direction to close the current paths through the fusible switch disconnect assembly 110 and again provide fusible protection to the current paths associated with the fuses 112. It is recognized that the rotational directions to open or close the current paths in the fusible switch disconnect assembly 100 can effectively be reversed from the directions discussed above.

Beneficially, however, the switch 100 allows the current paths through the fusible switch disconnect assembly 110 to be closed (i.e., connected) or opened (i.e., disconnected) without the door 104 being opened. Thus, in the example shown, three switchable current paths in the fusible switch disconnect assembly 110, each protected by one of the fuses 112, can be simultaneously switched opened or closed via simple rotation of the handle 106 while the access door 104 remains closed. Of course, where necessary, or when desired, the access door 104 can be opened as shown in FIG. 2, and the fuses 112 may be accessed in the interior cavity 132 for inspection or replacement.

The enclosure 102 and the door 104 may each be fabricated from sheet metal, more specifically 14 AWG cold rolled steel, or another suitable material known in the art according to known techniques, and thus provide a sturdy enclosure for the switch mechanism 108 and the fusible switch disconnect assembly 110. The enclosure 102 may be fabricated in three pieces (e.g., the side walls 124, 126 and rear wall 128 formed as one piece and the top and bottom walls 120, 122 formed as separate pieces) fastened together using known fastening techniques such as riveting. The enclosure 102 is therefore manufacturable at relatively low cost. Other materials and fabrication techniques, however, are possible.

The enclosure 102 may further include predefined separable portions 136, 138 of varying size, sometimes referred to as knockout portions, formed in the top and bottom walls 120, 122. The knockout portions 136, 138 may be selectively removed to provide corresponding openings in the top or bottom wall 120, 122 for electrical wires, cables or conduits so that line and load side connections to external circuitry may be established with the fusible switch disconnect assembly 110. Similar knockout portions could be provided in the side walls 124, 126 or the rear wall 128 to further accommodate line and load side electrical wires, cables and the like approaching the enclosure 102 from various other directions.

The enclosure rear wall 128 may be provided with mounting through hole openings 140 to facilitate mounting of the enclosure 102 on a wall or other support structure using fasteners such as screws. While three mounting openings 140 are provided in the example shown, greater or fewer mounting openings are contemplated.

The handle 106 in an exemplary embodiment is fabricated from plastic or another suitable material known in the art according to known techniques. The handle 106 may include different portions having different colors, and may include graphics, symbols, indicia or other features to more clearly convey opened and closed positions to persons such as installers and technicians responsible for establishing, servicing and maintaining an electrical power system. While an exemplary handle 106 is shown having a certain geometric shape and profile, various other geometries and profiles are likewise possible in further and/or alternative embodiments.

Figure 4:
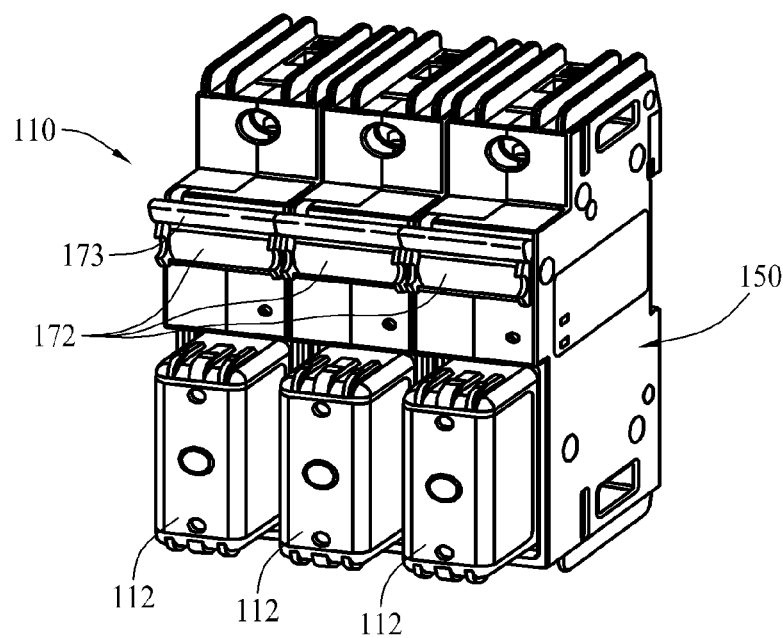
FIG. 4 illustrates an exemplary fusible disconnect assembly for the switch shown in FIGS. 1-3.
Figure 5:
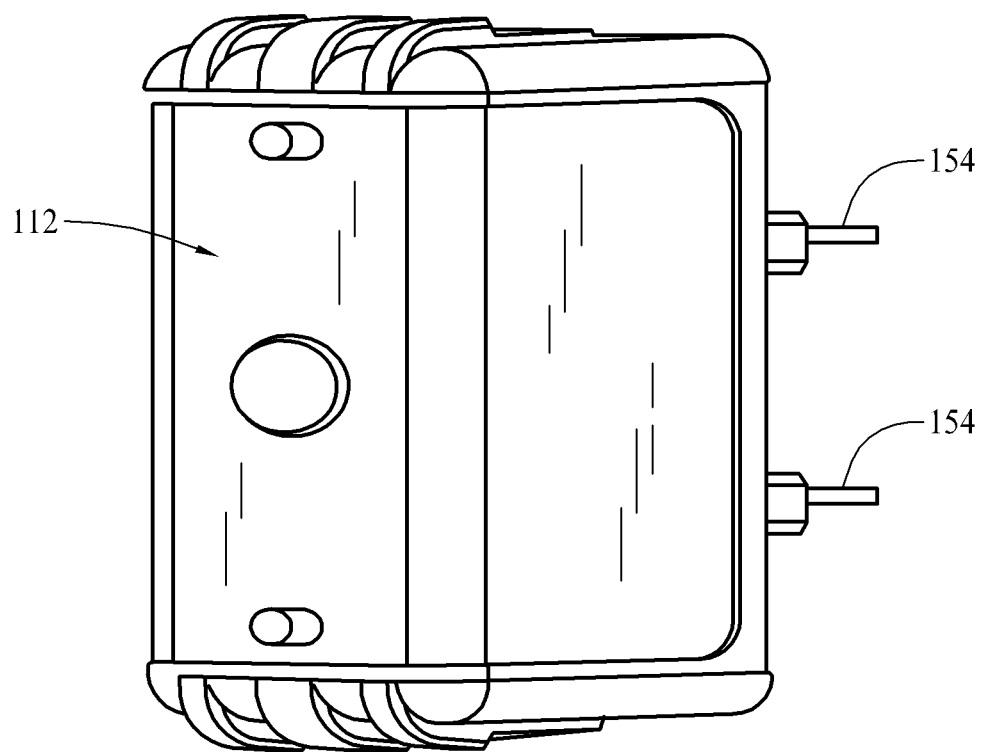
FIG. 5 illustrates an exemplary fuse for the disconnect assembly shown in FIG. 4.
Figure 6:
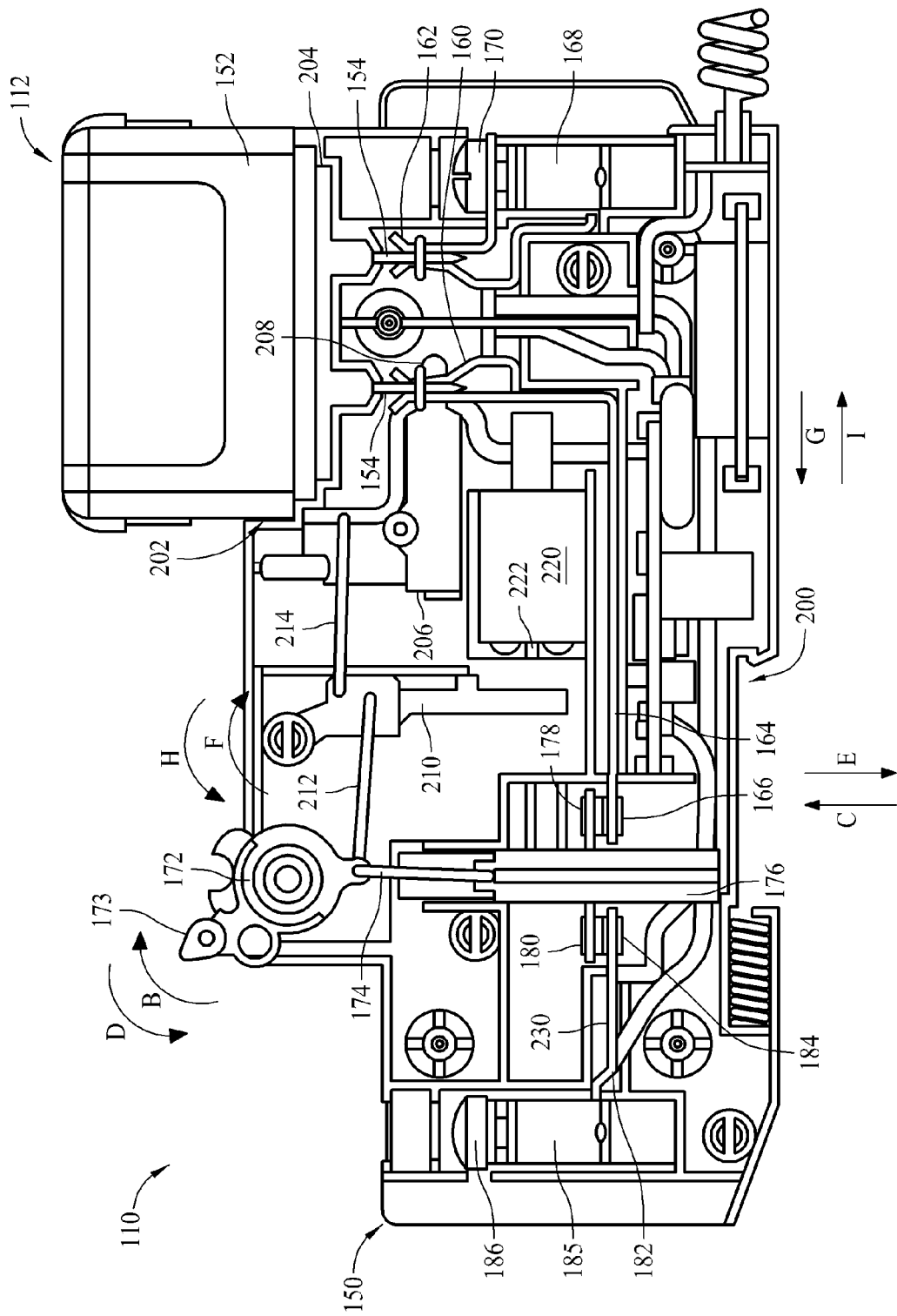
FIG. 6 is a side elevational view of the fusible disconnect assembly shown in FIG. 4 with a portion removed.

FIGS. 4-6 illustrate an exemplary fusible switch disconnect assembly 110 and fuses 112 utilized in the disconnect switch 100 (FIGS. 1-3).

The assembly 110 includes a disconnect housing 150 fabricated from an electrically nonconductive or insulative material such as plastic. The housing 150 may be fabricated as a single piece, or multiple pieces mechanically coupled or ganged together. The housing 150 is configured or adapted to receive one or more fuses 112 in the form of retractable rectangular fuse modules shown. The fuses 112 are received in a side-by-side relationship in a generally compact arrangement. The disconnect housing 150 and its internal components described below, are sometimes referred to as a base assembly that receives the retractable fuse modules 112. While rectangular fuse modules 112 are shown in the exemplary embodiment illustrated, it is recognized that the disconnect housing 150 may alternatively be configured to receive and engage another type of fuse, such as cylindrical or cartridge fuses familiar to those in the art.

The exemplary fuse module 112 (FIGS. 5 and 6) includes a rectangular housing 152 fabricated from an electrically nonconductive or insulative material such as plastic, and conductive terminal elements in the form of terminal blades 154 extending from the housing 152. A primary fuse element or fuse assembly is located within the housing 152 and is electrically connected between the terminal blades 154 to provide a current path therebetween. Such fuse modules 112 are known and in one embodiment the rectangular fuse module is a CUBEFuse™ power fuse module commercially available from Cooper Bussmann of St. Louis, Mo. The fuse module 112 provides overcurrent protection via the primary fuse element therein that is configured to melt, disintegrate or otherwise fail and permanently open the current path through the fuse element between the terminal blades 154 in response to predetermined current conditions flowing through the fuse element in use. When the fuse element opens in such a manner, the fuse module 112 must be removed and replaced to restore affected circuitry.

A variety of different types of fuse elements, or fuse element assemblies, are known and may be utilized in the fuse module 112 with considerable performance variations in use. Also, the fuse module 112 may include fuse state indication features, a variety of which are known in the art, to identify the permanent opening of the primary fuse element such that the fuse module 112 can be quickly identified for replacement via a visual change in appearance when viewed from the exterior of the fuse module housing 152. Such fuse state indication features may involve secondary fuse links or elements electrically connected in parallel with the primary fuse element in the fuse module 112.

A conductive line side fuse clip 160 may be situated within the disconnect housing 150 of the fusible switch disconnect assembly 110 and may receive one of the terminal blades 154 of the fuse module 112. A conductive load side fuse clip 162 may also be situated within the disconnect housing 150 and may receive the other of the fuse terminal blades 154. The line side fuse clip 160 may be electrically connected to a first line side terminal 164 provided in the disconnect housing 150, and the first line side terminal 164 may include a stationary switch contact 166. The load side fuse clip 162 may be electrically connected to a load side connection terminal 168. In the example shown, the load side connection terminal 168 is a box lug terminal operable with a screw 170 to clamp or release an end of a connecting wire to establish electrical connection with load side electrical circuitry. Other types of load side connection terminals are known, however, and may be provided in alternative embodiments.

A rotary switch actuator 172 is further provided in the disconnect housing 150, and is mechanically coupled to an actuator link 174 that, in turn, is coupled to a sliding actuator bar 176. The actuator bar 176 carries a pair of switch contacts 178 and 180. In an exemplary embodiment, the switch actuator 172, the link 174 and the actuator bar 178 may be fabricated from nonconductive materials such as plastic. A second conductive line side terminal 182 including a stationary contact 184 is also provided, and a line side connecting terminal 185 is also provided in the disconnect housing 150. In the example shown, the line side connection terminal 185 is a box lug terminal operable with a screw 186 to clamp or release an end of a connecting wire to establish electrical connection with line side electrical circuitry. Other types of line side connection terminals are known, however, and may be provided in alternative embodiments. While in the illustrated embodiment the line side connecting terminal 185 and the load side connecting terminal 168 are of the same type (i.e., both are box lug terminals), it is contemplated that different types of connection terminals could be provided on the line and load sides of the disconnect housing 150 if desired.

Electrical connection of the device 110 to power supply circuitry, sometimes referred to as the line side, may be accomplished in a known manner using the line side connecting terminal 185. Likewise, electrical connection to load side circuitry may be accomplished in a known manner using the load side connecting terminal 168. As mentioned previously, a variety of connecting techniques are known (e.g., spring clamp terminals and the like) and may alternatively be utilized to provide a number of different options to make the electrical connections in the field. The configuration of the connecting terminals 185 and 168 accordingly are exemplary only.

Figure 7:
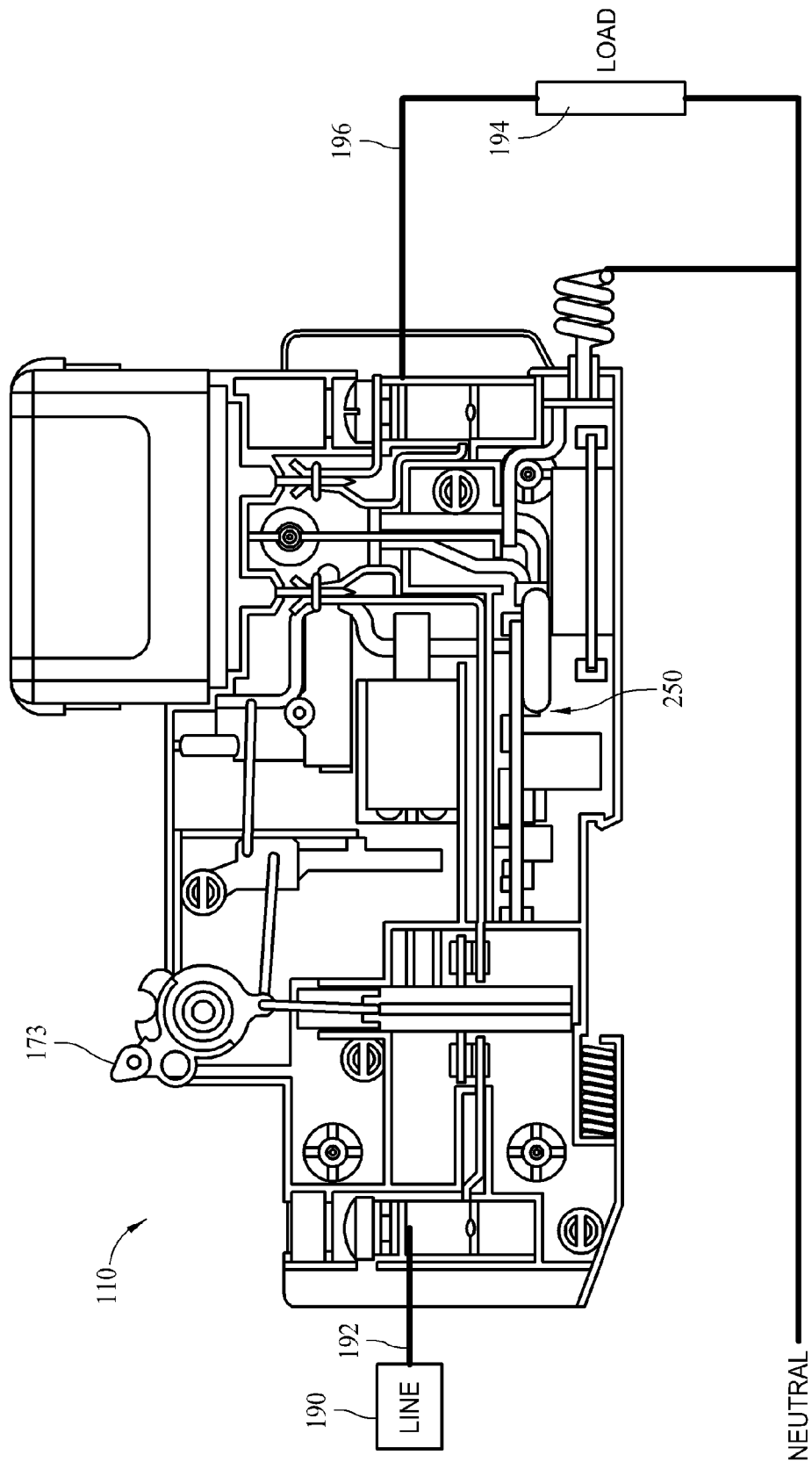
FIG. 7 is a partial schematic showing exemplary electrical connections to the fusible disconnect assembly.

In the position shown in FIG. 6, the disconnect device 110 is shown in the closed position with the switch contacts 180 and 178 mechanically and electrically engaged to the stationary contacts 184 and 166, respectively. As such, and as further shown in FIG. 7 when the device 110 is connected to line side circuitry 190 with a first connecting wire 192 via the line side connecting terminal 185, and also when the load side terminal 168 is connected to load side circuitry 194 with a connecting wire 196, a circuit path is completed through conductive elements in the disconnect housing 150 and the fuse module 112 when the fuse module 112 is installed and when the primary fuse element therein is a non-opened, current carrying state.

Specifically, and referring again to FIGS. 6 and 7, electrical current flow through the disconnect switch device 110 is as follows when the switch contacts 178 and 180 are closed, when the device 110 is connected to line and load side circuitry as shown in FIG. 7, and when the fuse module 112 is installed. Electrical current flows from the line side circuitry 190 through the line side connecting wire 192, and from the wire 192 to and through the line side connecting terminal 185. From the line side connecting terminal 185 current then flows to and through the second line terminal 182 and to the stationary contact 184. From the stationary contact 184 current flows to and through the switch contact 180, and from the switch contact 180 current flows to and through the switch contact 178. From the switch contact 178 current flows to and through the stationary contact 166, and from the stationary contact 166 current flows to and through the first line side terminal 164. From the first line side terminal 164 current flows to and through the line side fuse clip 162, and from the line side fuse clip 162 current flows to and through the first mating fuse terminal blade 154. From the first terminal blade 154 current flows to and through the primary fuse element in the fuse module 112, and from the primary fuse element to and through the second fuse terminal blade 154. From the second terminal blade 154 current flows to and through the load side fuse clip 162, and from the load side fuse clip 162 to and through the load side connecting terminal 168. Finally, from the connecting terminal 168 current flows to the load side circuitry 194 via the wire 196 (FIG. 33). As such, a circuit path or current path is established through the device 110 that includes the fuse element of the fuse module 112. Similar current paths are provided in the fusible switch disconnect device 112 for each of the fuses 112. That is, the components defining the current path as explained in relation to FIG. 6 are duplicated for each fuse module 112. Each current path will include a switch actuator 172 and switch contacts associated with the actuator, and hence in the example shown there is one switch actuator 172 and one set of switchable contacts for each of the fuse modules 112.

Disconnect switching to temporarily open one of the current paths in the device 110 may be accomplished in multiple ways. First, and as shown in FIG. 6, a portion 173 of each switch actuator 172 projects through an upper surface of the disconnect housing 150 and is therefore accessible to be grasped for direct manual manipulation by a person, or alternatively may be engaged by the switch actuator guide 270 (FIG. 2) for indirect manipulation via the switch mechanism 108. Specifically, the switch actuator(s) 172 of the fusible switch disconnect assembly 110, via the portions 173 extending from the disconnect housing 150, may be rotated from a closed position as shown in FIG. 6 to an open position in the direction of arrow B, causing the associate actuator link(s) 174 to move the sliding bar(s) 176 linearly in the direction of arrow C and moving the switch contacts 180 and 178 away from the stationary contacts 184 and 166 in each current path. Eventually, the switch contacts 180 and 178 in each path become mechanically and electrically disengaged from the stationary contacts 184 and 166 and the circuit path between the first and second line terminals 164 and 182, which includes the primary fusible element of one of the fuse module 112, may be opened via the separation of the switch contacts 180 and 164 when the fuse terminal blades 154 are received in the line and load side fuse clips 160 and 162.

When the circuit path(s) in the device 110 are opened in such a manner via rotational displacement of the switch actuator(s) 172, the associated fuse module(s) 112 become electrically disconnected from the first line side terminal 182 and the associated line side connecting terminal 185 in each path. In other words, an open circuit is established between the line side connecting terminal 185 and the first terminal blade 154 of the fuse module 112 that is received in the line side fuse clip 160. The operation of switch actuator 172 and the displacement of the sliding bar 176 in each path to separate the contacts 180 and 178 from the stationary contacts 184 and 166 may be assisted with bias elements such as springs. Particularly, the sliding bar 176 may be biased toward the open position wherein the switch contacts 180 and 178 are separated from the contacts 184 and 186 by a predetermined distance. The dual switch contacts 184 and 166 mitigate electrical arcing concerns as the switch contacts 184 and 166 are engaged and disengaged.

Once the switch actuator(s) 172 of the disconnect device 110 is switched open to interrupt the current path in the device 110 and disconnect the fuse module(s) 112, the current path(s) in the device 110 may be closed to once again complete the circuit path(s) through the fuse module(s) 112 by rotating the switch actuator 172 in the opposite direction indicated by arrow D in FIG. 6. As the switch actuator 172 in each path rotates in the direction of arrow D, the actuator link 174 causes the sliding bar 176 to move linearly in the direction of arrow E and bring the switch contacts 180 and 178 toward the stationary contacts 184 and 164 to close the circuit path through the first and second line terminals 164 and 182. As such, by moving the actuators 172 to a desired position, the fuse modules 112 and associated load side circuitry 194 (FIG. 7) may be connected and disconnected from the line side circuitry 190 (FIG. 7) while the line side circuitry 190 remains "live" in an energized, full power condition. Alternatively stated, by rotating the switch actuators 172 to separate or join the switch contacts, the load side circuitry 194 may be electrically isolated from the line side circuitry 190 (FIG. 7), or electrically connected to the line side circuitry 194 on demand. When the actuator portions 173 of multiple actuators 172 are tied together as shown in FIG. 4, the device 110 is operable to connect or disconnect multiple current paths through the fuses 112 as a group rather than individually. In an alternative embodiment, however, the portions 173 of the switch actuators 172 extending from the disconnect housing 150 need not mechanically coupled to one another, such that the switchable current paths through the fuses 112 may be independently and individually opened or closed.

Additionally, the fuse modules 112 may be simply plugged into the fuse clips 160, 162 or extracted therefrom to install or remove the fuse module(s) 112 from the disconnect housing 150. The fuse housing 152 of each fuse module 112 projects from the disconnect housing 150 and is open and accessible from an exterior of the disconnect housing 150 so that a person simply can grasp the fuse housing 152 by hand and pull or lift the fuse module 112 in the direction of arrow C to disengage the fuse terminal blades 154 from the line and load side fuse clips 160 and 162 until the fuse module 112 is completely released from the disconnect housing 150. An open circuit is established between the line and load side fuse clips 160 and 162 when one or more of the terminal blades 154 of the fuse modules 112 are removed as the fuse modules 112 are released, and the associated circuit paths between the fuse clips 160 and 162 is completed when the fuse terminal blades 154 are engaged in the fuse clips 160 and 162 when the fuse modules 112 are installed. Thus, via insertion and removal of the fuse modules 112, the circuit paths through the device 110 can be opened or closed apart from the position of the switch contacts as described above.

Of course, the primary fuse element in the fuse modules 112 provides still another mode of opening the current paths through the device 110 when the fuse modules are installed in response to actual current conditions flowing through the fuse elements. As noted above, however, if the primary fuse element in one of the fuse modules 112 opens, it does so permanently and the only way to restore the affected current path through the device 110 is to replace the opened fuse module 112 with another one having a non-opened fuse element. As such, and for discussion purposes, the opening of the fuse element in one of the fuse modules 112 is permanent in the sense that the affected fuse module 110 and associated current path cannot be reset to once again complete the current path through the device. Mere removal of the fuse module 112, and also displacement of the switch actuator 172 as described, are in contrast considered to be temporary events and are resettable to easily complete an opened current path and restore full operation of the affected circuitry by once again installing the fuse module 112 and/or closing the switch contacts.

The fuse modules 112, or a replacement fuse module, can be conveniently and safely grasped by hand via the fuse module housings 152 and moved toward the switch housing 150 to engage the fuse terminal blades 154 to the line and load side fuse clips 160 and 162 in one of the current paths. The fuse terminal blades 154 are extendable through openings in the disconnect housing 150 to connect the fuse terminal blades 154 to the fuse clips 160 and 162. To remove the fuse modules 112, the fuse module housing 152 can be grasped by hand and pulled from the disconnect housing 150 until the fuse module is completely released. As such, the fuse modules 112 having the terminal blades 154 may be rather simply and easily plugged into the disconnect housing 150 and the fuse clips 160, 162 in each path, or unplugged as desired.

Such plug-in connection and removal of the fuse modules 112 advantageously facilitates quick and convenient installation and removal of the fuse modules 112 without requiring separately supplied fuse carrier elements and without requiring tools or fasteners common to other known fusible disconnect devices. Also, the fuse terminal blades 154 extend through and outwardly project from a common side of each fuse module body 152, and in the example shown the terminal blades 154 each extend outwardly from a lower side of the fuse housing 152 that faces the disconnect housing 150 as the fuse module 112 is mated to the disconnect housing 150.

In the exemplary embodiment shown, the fuse terminal blades 154 extending from the fuse module body 152 are generally aligned with one another and extend in respective spaced-apart parallel planes. It is recognized, however, that the terminal blades 154 in various other embodiments may be staggered or offset from one another, need not extend in parallel planes, and can be differently dimensioned or shaped. The shape, dimension, and relative orientation of the terminal blades 154, and the receiving fuse clips 160 and 162 in the disconnect housing 150 may serve as fuse rejection features that only allow compatible fuses to be used with the disconnect housing 150. In any event, because the terminal blades 154 project away from the lower side of the fuse housing 152, a person's hand when handling the fuse module housing 152 for plug in installation (or removal) is physically isolated from the terminal blades 154 and the conductive line and load side fuse clips 160 and 162 that receive the terminal blades 154 as mechanical and electrical connections therebetween are made and broken. The fuse modules 112 are therefore touch safe (i.e., may be safely handled by hand to install and remove the fuse module 112 without risk of electrical shock).

The disconnect device 110 is rather compact and occupies a reduced amount of space in an electrical power distribution system including the line side circuitry 190 and the load side circuitry 194, than other known fusible disconnect devices and arrangements providing similar effect. Exemplary dimensional values for exemplary embodiments of the switch 100 having different fuse modules 112 and ratings are set forth below in Table 1.

TABLE 1

| Fuse Module Current Rating | Fuse Module Voltage Rating (AC) | Fuse Module Voltage Rating (DC) | Interruption Rating (AC) | Interruption Rating (DC) | $L_1$ | $W_1$ | $D_1$ |
|---|---|---|---|---|---|---|---|
| 30 A | 600 | 250 | 200 kA | 100 kA | 8.5 in | 8 in | 6 in |
| 60 A | 600 | 250 | 200 kA | 100 kA | 8.5 in | 8 in | 6 in |
| 100 A | 600 | 250 | 200 kA | 100 kA | 12 in | 8 in | 7 in |

In the embodiment illustrated in FIG. 6 the disconnect housing 150 is provided with a DIN rail slot 200 that may be used to securely mount the disconnect housing 150 in place with snap-on installation to a DIN rail by hand and without tools. The DIN rail may be located in the enclosure 102 of the disconnect switch 100, and because of the smaller size of the device 110, more fuses 112 may be connected in the same or smaller space relative to conventional fusible disconnect devices. Thus, the interior cavity 132 of the enclosure 102 need not be as large as in other conventional switch disconnect devices providing comparable interruption capabilities.

More specifically, the device 110 can easily occupy less space in the disconnect switch enclosure 102, for example, than conventional in-line fuse and circuit breaker combinations. In particular, CUBEFuse™ power fuse modules occupy a smaller area, sometimes referred to as a footprint, in the disconnect switch 100 than non-rectangular fuses having comparable ratings and interruption capabilities. Reductions in the size of the disconnect switch 100, and specifically the enclosure 102 therefore are possible, while even providing increased interruption capabilities depending on the particular fuse modules 112 utilized.

In ordinary use, the circuit paths or current paths through the device 110 are preferably connected and disconnected at the switch contacts 184, 180, 178, 166 rather than at the fuse clips 160 and 162. By doing so, electrical arcing that may occur when connecting/disconnecting the circuit path may be contained at a location away from the fuse clips 160 and 162 to provide additional safety for persons installing, removing, or replacing fuses. By opening the switch contacts with the switch actuator 172 before installing or removing the fuse module 112, any risk posed by electrical arcing or energized conductors at the fuse and disconnect housing interface is eliminated. The disconnect device 110 is accordingly believed to be safer to use than many known fused disconnect switches. The opening of the switch contacts in the fusible switch disconnect device 110 may be ensured with the switch mechanism 108 described further below, providing a relatively safer disconnect switch 100.

The disconnect switching device 110 includes still further features, however, that improve the safety of the device 110 in the event that a person attempts to remove the fuse module 112 without first operating the actuator 172 to disconnect the circuit through the fuse module 112, and also to ensure that the fuse module 112 is compatible with the remainder of the device 110. That is, features are provided to ensure that the rating of the fuse module 112 is compatible with the rating of the conductive components in the disconnect housing 150.

As shown in FIG. 6, the disconnect housing 150 in one example includes an open ended receptacle or cavity 202 on an upper edge thereof that accepts a portion of the fuse housing 152 when the fuse module 112 is installed with the fuse terminal blades 154 engaged to the fuse clips 160, 162. The receptacle 202 is shallow in the embodiment depicted, such that a relatively small portion of the fuse housing 152 is received when the terminal blades 154 are plugged into the disconnect housing 150. A remainder of the fuse housing 152, however, generally projects outwardly from the disconnect housing 150 allowing the fuse module housing 152 to be easily accessed and grasped with a user's hand and facilitating a finger safe handling of the fuse module 112 for installation and removal without requiring tools. It is understood, however, that in other embodiments the fuse housing 152 need not project as greatly from the switch housing receptacle when installed as in the embodiment depicted, and indeed could even be substantially entirely contained within the switch housing 150 if desired.

In the exemplary embodiment shown in FIG. 6, the fuse housing 152 in each fuse module 112 includes a recessed guide rim 204 having a slightly smaller outer perimeter than a remainder of the fuse housing 152, and the guide rim 204 is seated in the switch housing receptacle 202 when the fuse module 112 is installed. It is understood, however, that the guide rim 204 may be considered entirely optional in another embodiment and need not be provided. The guide rim 204 may in whole or in part serve as a fuse rejection feature that would prevent someone from installing a fuse module 112 having a rating that is incompatible with the conductive components in the disconnect housing 150. Fuse rejection features could further be provided by modifying the terminal blades 154 in shape, orientation, or relative position to ensure that a fuse module having an incompatible rating cannot be installed.

In contemplated embodiments, the base of the device 110 (i.e., the disconnect housing 150 and the conductive components therein) has a rating that is ½ of the rating of the fuse module 112. Thus, for example, a base having a current rating of 20 A may preferably be used with a fuse module 112 having a rating of 40 A. Ideally, however, fuse rejection features such as those described above would prevent a fuse module of a higher rating, such as 60 A, from being installed in the base. The fuse rejection features in the disconnect housing 150 and/or the fuse module 112 can be strategically coordinated to allow a fuse of a lower rating (e.g., a fuse module having a current rating of 20 A) to be installed, but to reject fuses having higher current ratings (e.g., 60 A and above in the example being discussed). It can therefore be practically ensured that problematic combinations of fuse modules and bases will not occur. While exemplary ratings are discussed above, they are provided for the sake of illustration rather than limitation. A variety of fuse ratings and base ratings are possible, and the base rating and the fuse module rating may vary in different embodiments and in some embodiments the base rating and the fuse module rating may be the same.

As a further enhancement, the disconnect housing 150 includes an interlock element 206 that frustrates any effort to remove the fuse module 112 while the circuit path through the first and second line terminals 182 and 164 via the switch contacts 184, 180, 178, 166 is closed. The exemplary interlock element 206 shown includes an interlock shaft 208 at a leading edge thereof, and in the locked position shown in FIG. 6 the interlock shaft 208 extends through a hole in the first fuse terminal blade 154 that is received in the line side fuse clip 160. Thus, as long as the projecting interlock shaft 208 is extended through the opening in the terminal blade 154, the fuse module 112 cannot be pulled from the fuse clip 162 if a person attempts to pull or lift the fuse module housing 152 in the direction of arrow C. As a result, and because of the interlock element 206, the fuse terminal blades 154 cannot be removed from the fuse clips 160 and 162 while the switch contacts 178, 180 are closed and potential electrical arcing at the interface of the fuse clips 160 and 162 and the fuse terminal blades 154 is avoided. Such an interlock element 206 is believed to be beneficial for the reasons stated but could be considered optional in certain embodiments and need not be utilized.

The interlock element 206 is coordinated with the switch actuator 172 so that the interlock element 206 is moved to an unlocked position wherein the first fuse terminal blade 154 is released for removal from the fuse clip 160 as the switch actuator 172 is manipulated to open the device 110. More specifically, a pivotally mounted actuator arm 210 is provided in the disconnect housing 150 at a distance from the switch actuator 172, and a first generally linear mechanical link 212 interconnects the switch actuator 172 with the arm 210. The pivot points of the switch actuator 172 and the arm 210 are nearly aligned in the example shown in FIG. 6, and as the switch actuator 172 is rotated in the direction of arrow B, the link 212 carried on the switch actuator 172 simultaneously rotates and causes the arm 210 to rotate similarly in the direction of arrow F. As such, the switch actuator 172 and the arm 210 are rotated in the same rotational direction at approximately the same rate.

A second generally linear mechanical link 214 is also provided that interconnects the pivot arm 210 and a portion of the interlock element 206. As the arm 210 is rotated in the direction of arrow E, the link 214 is simultaneously displaced and pulls the interlock element 206 in the direction of arrow G, causing the projecting shaft 208 to become disengaged from the first terminal blade 154 and unlocking the interlock element 206. When so unlocked, the fuse module 112 can then be freely removed from the fuse clips 160 and 162 by lifting on the fuse module housing 152 in the direction of arrow C. The fuse module 112, or perhaps a replacement fuse module 112, can accordingly be freely installed by plugging the terminal blades 154 into the respective fuse clips 160 and 162.

As the switch actuator 172 is moved back in the direction of arrow D to close the disconnect device 110, the first link 212 causes the pivot arm 210 to rotate in the direction of arrow H, causing the second link 214 to push the interlock element 206 in the direction of arrow I until the projecting shaft 208 of the interlock element 206 again passes through the opening of the first terminal blade 154 and assumes a locked position with the first terminal blade 154. As such, and because of the arrangement of the arm 210 and the links 212 and 214, the interlock element 206 is slidably movable within the disconnect housing 150 between locked and unlocked positions. This slidable movement of the interlock element 206 occurs in a substantially linear and axial direction within the disconnect housing 150 in the directions of arrow G and I in FIG. 6.

In the example shown, the axial sliding movement of the interlock element 206 is generally perpendicular to the axial sliding movement of the actuator bar 176 that carries the switchable contacts 178 and 180. In the plane of FIG. 6, the movement of the interlock element 206 occurs along a substantially horizontal axis, while the movement of the sliding bar 176 occurs along a substantially vertical axis. The vertical and horizontal actuation of the sliding bar 176 and the interlock element 206, respectively, contributes to the compact size of the resultant device 110, although it is contemplated that other arrangements are possible and could be utilized to mechanically move and coordinate positions of the switch actuator 172, the switch sliding bar 176 and the interlock element 206. Also, the interlock element 206 may be biased to assist in moving the interlock element to the locked or unlocked position as desired, as well as to resist movement of the switch actuator 172, the sliding bar 176 and the interlock element 206 from one position to another. For example, by biasing the switch actuator 172 to the opened position to separate the switch contacts, either directly or indirectly via bias elements acting upon the sliding bar 176 or the interlock element 206, inadvertent closure of the switch actuator 172 to close the switch contacts and complete the current path may be largely, if not entirely frustrated, because once the switch contacts are opened a person must apply a sufficient force to overcome the bias force and move the switch actuator 172 back to the closed position shown in FIG. 30 to reset the device 110 and again complete the circuit path. If sufficient bias force is present, it can be practically ensured that the switch actuator 172 will not be moved to close the switch via accidental or inadvertent touching of the switch actuator 172.

The interlock element 206 may be fabricated from a nonconductive material such as plastic according to known techniques, and may be formed into various shapes, including but not limited to the shape depicted in FIG. 30. Rails and the like may be formed in the disconnect housing 150 to facilitate the sliding movement of the interlock element 206 between the locked and unlocked positions.

The pivot arm 210 is further coordinated with a tripping element 220 for automatic operation of the device 110 to open the switch contacts 178, 180. That is, the pivot arm 210, in combination a tripping element actuator described below, and also in combination with the linkage 174, 212, and 214 define a tripping mechanism to force the switch contacts 178, 180 to open independently from the action of any person. Operation of the tripping mechanism is fully automatic, as described below, in response to actual circuit conditions, as opposed to the manual operation of the switch actuator 172 described above. Further, the tripping mechanism is multifunctional as described below to not only open the switch contacts, but to also to displace the switch actuator 172 and the interlock element 206 to their opened and unlocked positions, respectively. The pivot arm 210 and associated linkage may be fabricated from relatively lightweight nonconductive materials such as plastic.

In the example shown in FIG. 6, the tripping element actuator 210 is an electromagnetic coil such as a solenoid having a cylinder or pin 222, sometimes referred to as a plunger, that is extendable or retractable in the direction of arrow G and I along an axis of the coil. The coil when energized generates a magnetic field that causes the cylinder or pin 222 to be displaced. The direction of the displacement depends on the orientation of the magnetic field generated so as to push or pull the plunger cylinder or pin 222 along the axis of the coil. The plunger cylinder or pin 222 may assume various shapes (e.g., may be rounded, rectangular or have other geometric shape in outer profile) and may be dimensioned to perform as hereinafter described.

In the example shown in FIG. 6, when the plunger cylinder or pin 222 is extended in the direction of arrow G, it mechanically contacts a portion of the pivot arm 210 and causes rotation thereof in the direction of arrow F. As the pivot arm 210 rotates, the link 212 is simultaneously moved and causes the switch actuator 172 to rotate in the direction of arrow B, which in turn pulls the link 174 and moves the sliding bar 176 to open the switch contacts 178, 180. Likewise, rotation of the pivot arm 210 in the direction of arrow F simultaneously causes the link 214 to move the interlock element 206 in the direction of arrow G to the unlocked position.

It is therefore seen that a single pivot arm 210 and the linkage 212 and 214 mechanically couples the switch actuator 172 and the interlock element 206 during normal operation of the device, and also mechanically couples the switch actuator 172 and the interlock element 206 to the tripping element 220 for automatic operation of the device. In the exemplary embodiment shown, an end of the link 174 connecting the switch actuator 172 and the sliding bar 176 that carries the switch contacts 178, 180 is coupled to the switch actuator 172 at approximately a common location as the end of the link 212, thereby ensuring that when the tripping element 220 operates to pivot the arm 210, the link 212 provides a dynamic force to the switch actuator 172 and the link 174 to ensure an efficient separation of the contacts 178 and 180 with a reduced amount of mechanical force than may otherwise be necessary. The tripping element actuator 220 engages the pivot arm 210 at a good distance from the pivot point of the arm 210 when mounted, and the resultant mechanical leverage provides sufficient mechanical force to overcome the static equilibrium of the mechanism when the switch contacts are in the opened or closed position. A compact and economical, yet highly effective tripping mechanism is therefore provided. Once the tripping mechanism operates, it may be quickly and easily reset by moving the switch actuator 172 back to the closed position that closes the switch contacts.

Suitable solenoids are commercially available for use as the tripping actuator element 220. Exemplary solenoids include LEDEX® Box Frame Solenoid Size B17M of Johnson Electric Group (www.ledex.com) and ZHO-0520L/S Open Frame Solenoids of Zohnen Electric Appliances (www.zonhen.com). In different embodiments, the solenoid 220 may be configured to push the arm 210 and cause it to rotate, or to pull the contact arm 210 and cause it to rotate. That is, the tripping mechanism can be operated to cause the switch contacts to open with a pushing action on the pivot arm 210 as described above, or with a pulling action on the pivot arm 210. Likewise, the solenoid could operate on elements other than the pivot arm 210 if desired, and more than one solenoid could be provided to achieve different effects.

In still other embodiments, it is contemplated that actuator elements other than a solenoid may suitably serve as a tripping element actuator to achieve similar effects with the same or different mechanical linkage to provide comparable tripping mechanisms with similar benefits to varying degrees. Further, while simultaneous actuation of the components described is beneficial, simultaneous activation of the interlock element 206 and the sliding bar 176 carrying the switch contacts 178, 180 may be considered optional in some embodiments and these components could accordingly be independently actuated and separately operable if desired. Different types of actuator could be provided for different elements.

Moreover, in the embodiment shown, the trip mechanism is entirely contained within the disconnect housing 150 while still providing a relatively small package size. It is recognized, however, that in other embodiments the tripping mechanism may in whole or in part reside outside the disconnect housing 150, such as in separately provided modules that may be joined to the disconnect housing 150. As such, in some embodiments, the trip mechanism could be, at least in part, considered an optional add-on feature provided in a module to be used with the disconnect housing 150. Specifically, the trip element actuator and linkage in a separately provided module may be mechanically linked to the switch actuator 172, the pivot arm 210 and/or the sliding bar 176 of the disconnect housing 150 to provide comparable functionality to that described above, albeit at greater cost and with a larger overall package size.

The tripping element 220 and associated mechanism may further be coordinated with a detection element and control circuitry to automatically move the switch contacts 178, 180 to the opened position when predetermined electrical conditions occur. In one exemplary embodiment, the second line terminal 182 is provided with an in-line detection element 230 that is monitored by control circuitry 250. As such, actual electrical conditions can be detected and monitored in real time and the tripping element 220 can be intelligently operated to open the circuit path in a proactive manner independent of operation of the fuse module 112 itself and/or any manual displacement of the switch actuator 172. That is, by sensing, detecting and monitoring electrical conditions in the line terminal 182 with the detection element 230, the switch contacts 178, 180 can be automatically opened with the tripping element 220 in response to predetermined electrical conditions that are potentially problematic for either of the fuse module 112 or the base assembly (i.e., the disconnect housing 150 and its components).

In particular, the control circuitry 250 may open the switch contacts in response to conditions that may otherwise, if allowed to continue, cause the primary fuse element in the fuse module 112 to permanently open and interrupt the electrical circuit path between the fuse terminals 154. Such monitoring and control may effectively prevent the fuse module 112 from opening altogether in certain conditions, and accordingly save it from having to be replaced, as well as providing notification to electrical system operators of potential problems in the electrical power distribution system. Beneficially, if permanent opening of the fuse is avoided via proactive management of the tripping mechanism, the device 110 becomes, for practical purposes, a generally resettable device that may in many instances avoid any need to locate a replacement fuse module, which may or may not be readily available if needed, and allow a much quicker restoration of the circuitry than may otherwise be possible if one or more of the fuse modules 112 has to be replaced. It is recognized, however, that if certain circuit conditions were to occur, permanent opening of one or more of the fuses 112 may be unavoidable.

The detecting element 230 may be provided in the form of a low resistance shunt 230 that facilitates current sensing and measurement. In exemplary embodiments, the shunt 230 may be a 100 or 200 micro Ohm shunt element. The shunt element is placed in-line (i.e. is electrically connected in series) with the current path in the line terminal 182, rather than in a parallel current path (i.e., a path electrically connected in parallel with the circuit path established through the device 110). In another embodiment, however, current may be detected along a parallel current path if desired, and used for control purposes in a similar manner to that described below. The shunt element and the control circuitry are more completely described in the related applications referenced above, as well as alternative sensing elements.

Figure 8:
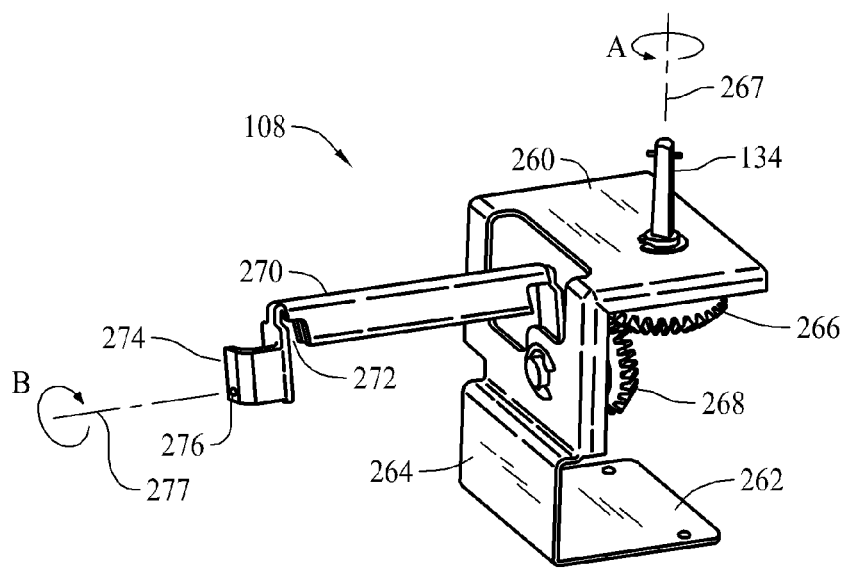
FIG. 8 illustrates a rotary switch actuator assembly for the switch shown in FIGS. 1-3.

FIG. 8 illustrates the exemplary switch mechanism 108 that couples the actuator handle 106 (FIGS. 1-3) to the switch actuators 172 in the fusible switch disconnect device assembly 110. The switch mechanism 108 generally includes spaced apart plates 260 and 262 and a riser section 264 extending between and interconnecting the plates 260 and 262. The shaft 134 extends from an upper side of the plate 260, extends through a through hole formed in the plate 260, and engages a first gear 266 on the opposing side of the plate 260. The shaft 134 and the gear 266 are both rotatable about a first axis 267 in the direction of arrow A as the handle 106 is rotated, or in the opposite direction depending on which direction the handle 206 is rotated.

The riser section 264 extends generally perpendicular to the plate 260, and includes a second rotatably mounted gear 268 mutually engaged to the first gear 266 but at an axis 90° from the first gear. As such, while the first gear 266 rotates in the direction of arrow A about a vertical axis in the view of FIG. 8, the second gear 268 that engages the first gear is caused to rotate about a horizontal axis in the view of FIG. 8. An actuator guide 270 is coupled to the second gear 270 and rotates therewith. The actuator guide 270 defines a sleeve 272 that captures the extended portions 173 (FIGS. 4 and 6-7) of the switch actuators 172 of the fusible switch disconnect assembly 110 as the guide 270 rotates.

As such, when the extended actuator portions 273 are received in the sleeve 272, rotation of the switch actuator guide 270 causes the switch guide 270 to contact the switch actuators 172 of the disconnect device 110 and rotate the switch actuators 172 in the direction of arrows B or D (FIG. 6) to open or close the switch contacts in the fusible switch disconnect device 110. As seen in FIG. 2, however, a clearance may be provided such that the cover guide 270 when fully rotated provides unobstructed access to the portions 273 of the switch actuators 272 extending from the disconnect housing 150. Therefore, while the door 104 is opened, a person may, individually or collectively, switch the actuators 272 on an off via the portions 273. The actuator guide 270 does not preclude any ability of the user to operate the disconnect device to open and close the current paths through the disconnect device 110 independently from any operation of the handle 106 or the switch mechanism 108. However, the handle 106 and the switch mechanism 108 may be safely and conveniently utilized to disconnect all the current paths in the disconnect device 110 without ever having to open the door 104. Thus, when a complete disconnect of the current paths is desired, it can be more quickly accomplished using the handle 106 than opening the access door 104 to access the switch actuators 172 of the disconnect device 110. This is especially so in a scenario wherein the extending portions 173 of the switch actuators 172 are not mechanically tied together and thus each individual extending portion 173 would need to be individually manipulated.

Referring again to FIG. 8, opposite to the second gear 268, the actuator guide 270 may include a mounting section 274 that interfaces with the enclosure side wall 124 (FIG. 2). The mounting section 274 may include a peg 276 that mates with a corresponding aperture in the enclosure side wall 124. The actuator guide 270 is rotatable on side wall 124 about the axis 277 as the second gear 268 rotates. The rotational axis 277 is parallel to the rotational axes of the switch actuators 172 of the disconnect device 110. The rotatable axis 277 of the actuator guide 270 extends perpendicular, however, to the rotational axis 267 of the shaft 134. Thus, the switch mechanism 108 transfers rotary motion about two mutually perpendicular axes. The switch 100 including the switch mechanism 100 is accordingly sometimes referred to as a rotary disconnect switch.

Figure 9:
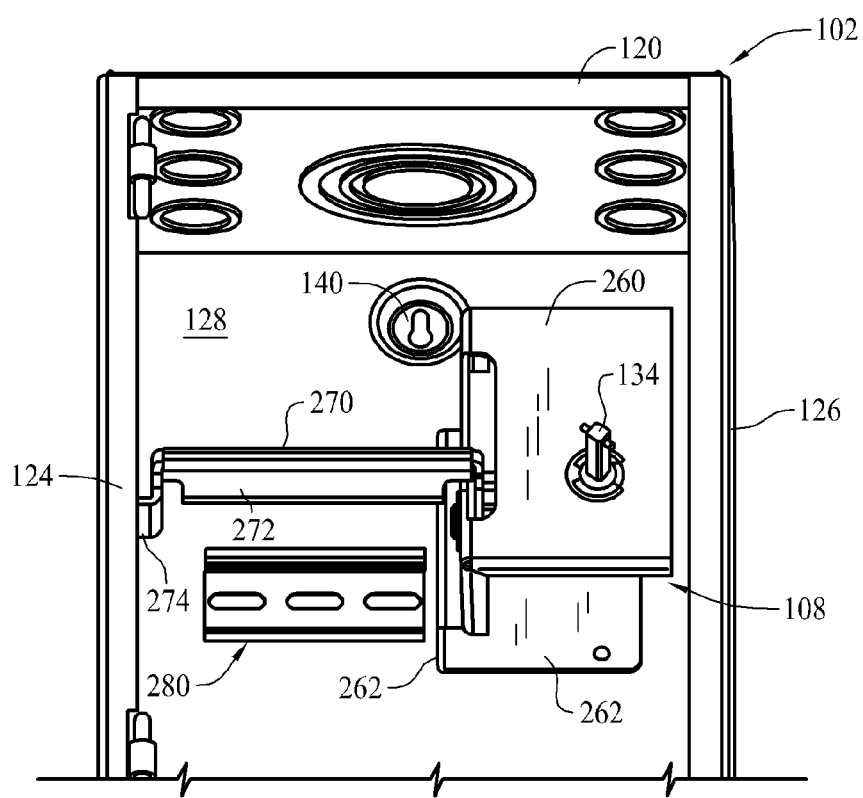
FIG. 9 is a partial interior view of the switch including the rotary switch actuator assembly.
Figure 10:
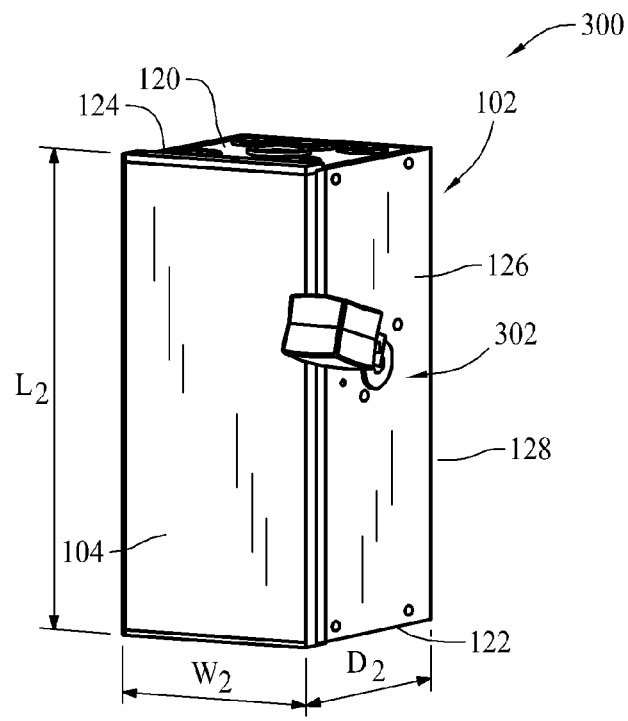
FIG. 10 is a front perspective view of an exemplary second embodiment of a disconnect switch.
Figure 11:
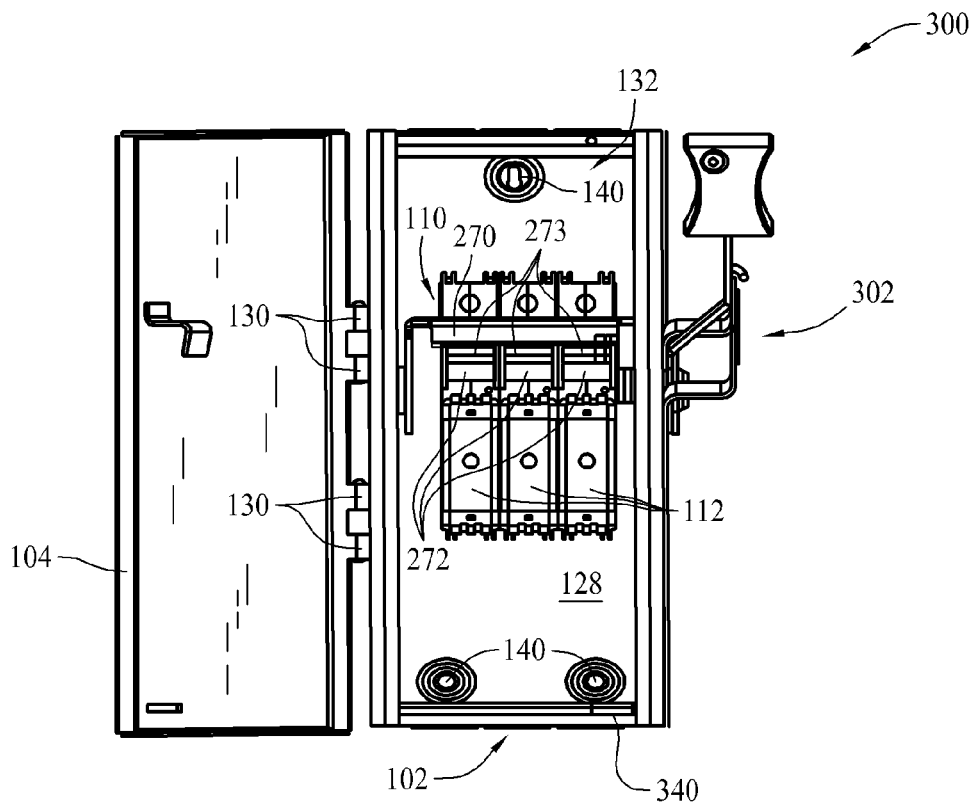
FIG. 11 is a front view of the switch shown in FIG. 100 with the door opened.
Figure 12:
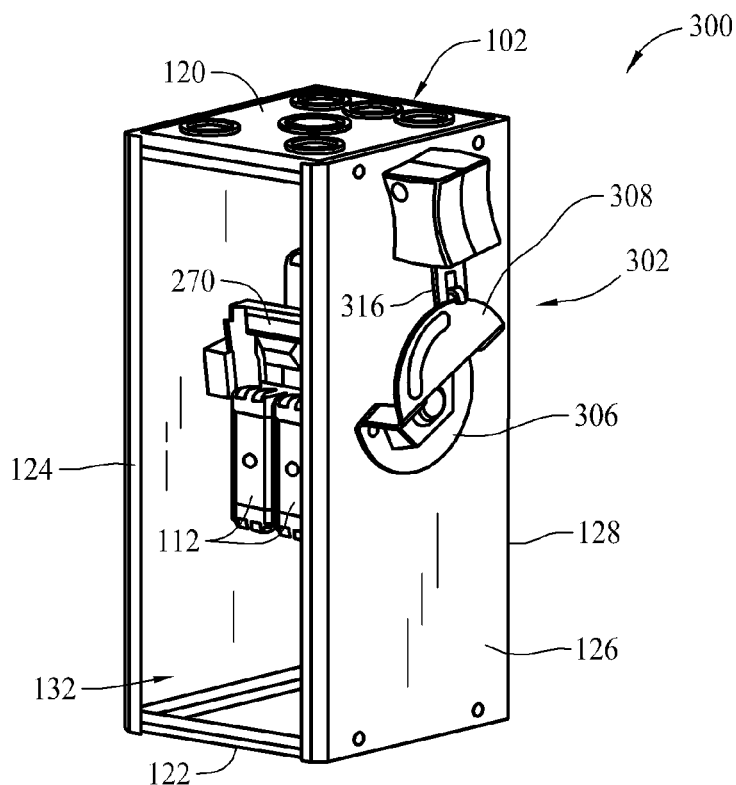
FIG. 12 is a first side view of the switch shown in FIG. 11.
Figure 13:
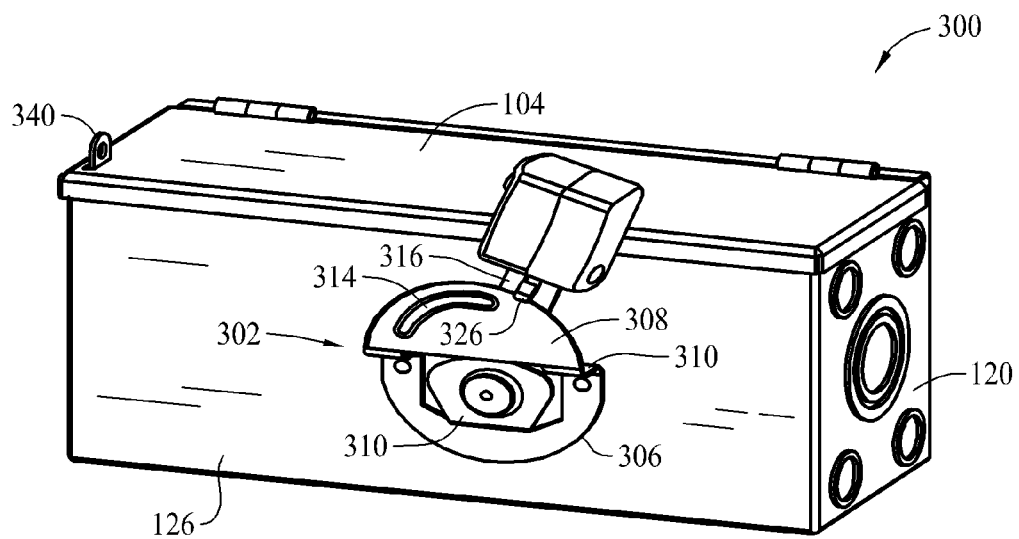
FIG. 13 is a second side view of the switch shown in FIG. 11.
Figure 14:
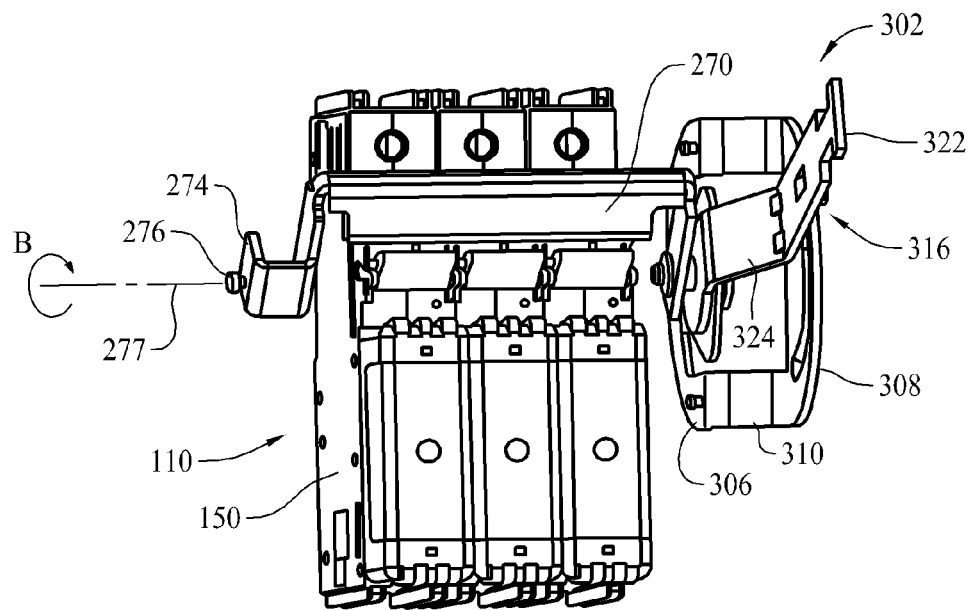
FIG. 14 illustrates an actuation assembly for the switch shown in FIGS. 10-13.
Figure 15:
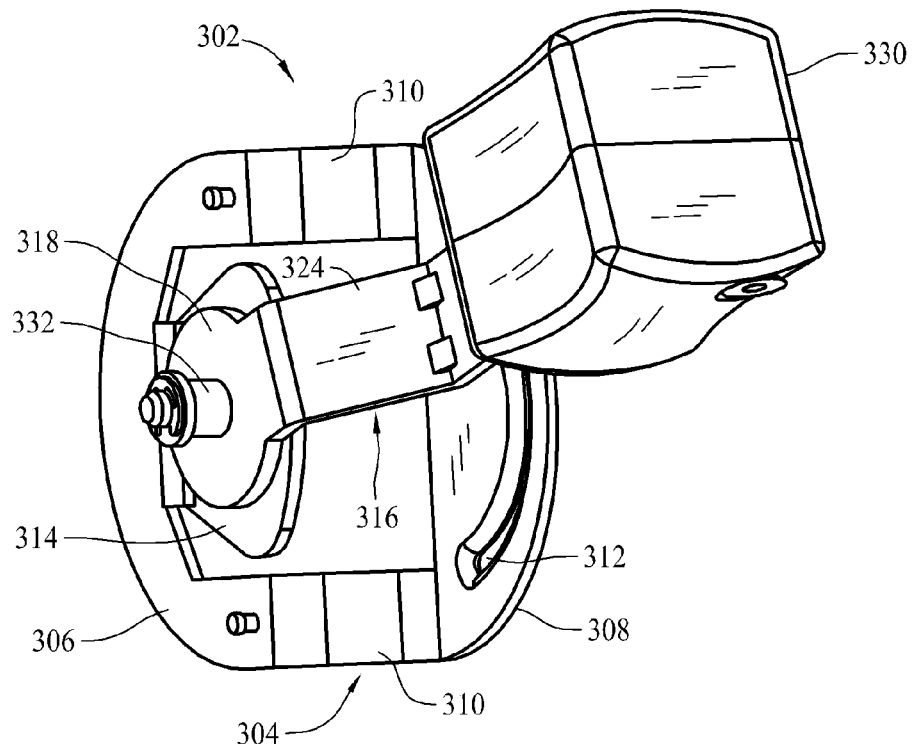
FIG. 15 illustrates a portion of the actuation assembly shown in FIG. 14.

FIG. 9 shows the switch mechanism 108 mounted to the enclosure 102. The plate 262 is coupled to the rear wall 128 with fasteners such as rivets, and the mounting section 274 of the actuator guide 274 is rotatably mounted to the enclosure wall 124. A DIN rail 280 is also mounted to the rear wall 128 via, for example, spot welding techniques. The fusible switch disconnect assembly 110 may be installed on the DIN rail 280 with snap-fit engagement via the DIN rail slot 200 (FIG. 6), either before or after installation of the switch mechanism 108. The sleeve 272 of the actuator guide 270 is positioned to receive and actuate the extended actuator portions 273 (FIGS. 4 and 6-7) as the guide 270 rotates as explained above. Finally, when the access door 104 (FIGS. 1 and 2) is closed, the handle 106 engages the switch mechanism shaft 134.

With the door 104 closed, rotation of the handle 106, via the switch mechanism 108, causes the current paths associated with each of the fuse modules 112 to be opened or closed. Rotation of the handle 106 in the direction of arrow A or a direction opposite to arrow A (FIGS. 1 and 2) on the exterior of the enclosure 102 is translated via the switch mechanism 108 to the directions of arrows B and D (FIG. 6) on the interior of the enclosure 102. The actuator guide 270 contacts the switch actuator portions 273 of the fusible disconnect switch assembly 110 and rotates them in the directions of arrows B and D to open or close the current paths associated with all of the fuses 112 as the handle 106 is rotated while the door 104 is closed, providing even further safety benefits. Likewise, when the tripping mechanism in the fusible switch disconnect device 110 causes one of the current paths to be switched open, the actuator guide 270 will be rotated automatically with the switch actuators 172, and via the switch mechanism 108, the handle 106 on the exterior of the enclosure 102 will be turned to an opened position.

As described above, the sensing and control circuitry in the fusible switch disconnect device 110 allows the tripping mechanism to operate proactively and effectively prevent the fuse modules 112 from opening. As such, in many scenarios contemplated, the fusible switch disconnect device 110 may generally be reset simply by returning the handle 206 to its closed position after operation of the tripping mechanism. Where advisable, the access door 104 can be opened for inspection of the fuses 112. The switch mechanism 108, including the actuator guide 270 provides an obstructed path to install, remove and replace fuses 112 as needed. Because the shaft 134 becomes disengaged from the handle 106 as the door 104 is opened, however, the handle 106 is operable to open and close the fused current paths in the disconnect device 110 only when the door 104 is closed.

FIGS. 10-17 illustrate various views and components of a second embodiment of a disconnect switch 300 similar in many aspects to the disconnect switch 100 described above. The switch 300 includes a similar enclosure 102 but having different dimensions $L_2$, $W_2$ and $D_2$ and also includes another switch mechanism 302.

The switch mechanism 302 includes a transfer element 304 having a first plate 306, a second plate 308 extending generally parallel to the first plate 306, and a riser section 310 extending therebetween. The first plate 306 is mounted to an exterior of the enclosure side wall 126 using fasteners such as rivets. The first plate 306 includes a pivot mount section 314 formed therewith, and the pivot mount section 314 is slightly spaced from the enclosure side wall 126.

The riser section 310 extends substantially perpendicularly from the first plate 306, and the second plate 308 extends perpendicularly from the riser section 310. The second plate 308 includes an arcuate guide slot 312 that may be used as an indicator or reference point for determining the state of the switch 300 as opened or closed.

Figure 16:
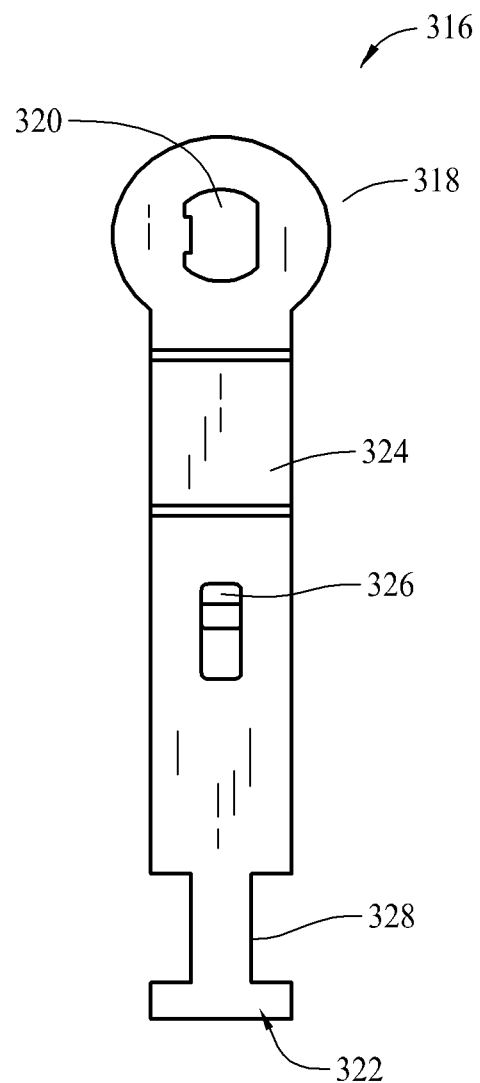
FIG. 16 illustrates a portion of the handle assembly shown in FIG. 14.
Figure 17:
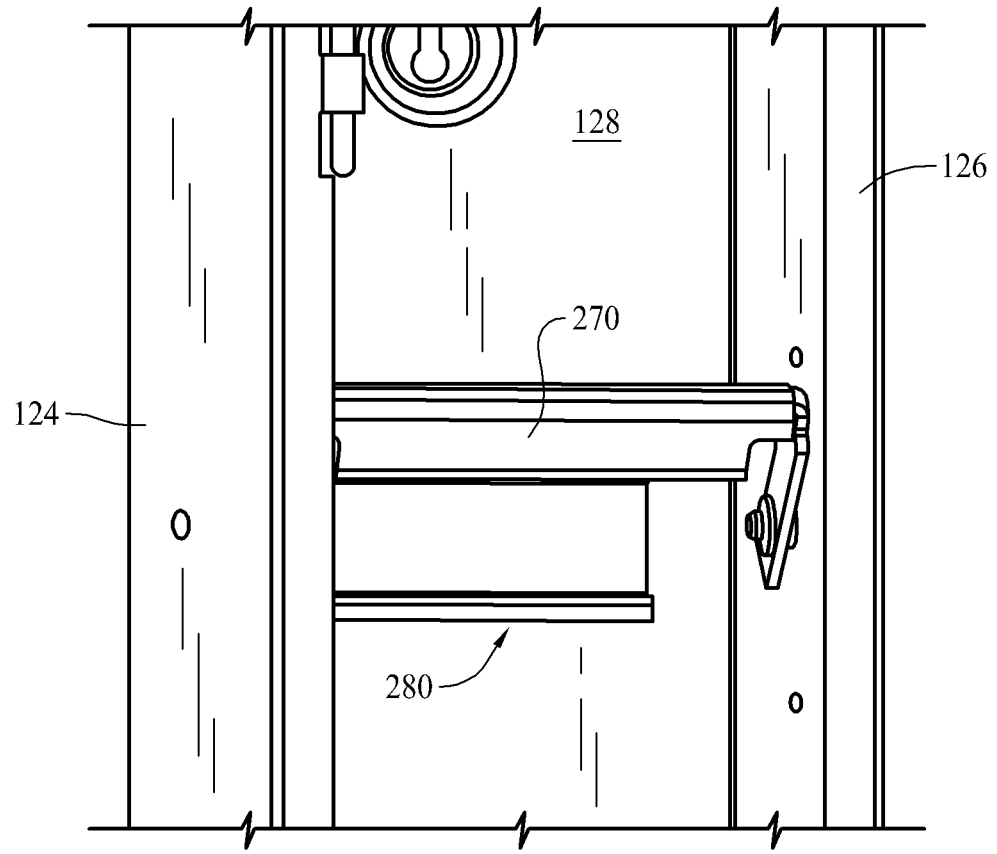
FIG. 17 is a partial interior view of the switch including the switch actuator assembly shown in FIG. 14.

A handle lever 316 attaches to both the pivot mount 314 and to the second plate 308. As shown in FIG. 16, the lever 316 includes a rotatable end 318 having a keyed slot 320 attachable to the pivot mount section 314, a handle section 322 extending parallel to the rotatable end 318, and an angled transition section 324 extending between and connecting the end 318 and the handle section 322. The handle section 322 may further include a guide tab 326 that may be clipped onto an upper periphery of the second plate 308, and a keyed portion 328 configured to connect to a handle 330. The handle 330, attached to the lever 316, is pivotal about a shaft 332 associated with the transfer plate 314. The shaft 332 is extended through the enclosure side wall 126 and is connected to the actuator guide 270 which rotates therewith. Thus, movement of the handle 330 in the general direction of the guide slot 312 (i.e., along an arcuate path of motion) pivots the lever 316 at the end 318 at a location exterior to the enclosure 102, while the actuator guide 270 extending in the interior of the enclosure 102 rotates. At the end 318, the lever 316 rotates about an axis parallel to the rotatable axis 277 of the actuator guide 270, which is also parallel to the rotational axis of the switch actuators 172 of the disconnect device 110. The actuator guide 270 that rotates with the lever 316 may accordingly, in response to manipulation of the handle 330, contact the switch actuators 172 and cause them to open and close the current paths in the disconnect device 110 in a similar manner to that described above, with similar benefits.

The transfer element 304, lever 316, and actuator guide 370 may be formed from cold rolled steel according to known techniques, or from other known suitable materials and techniques. The handle 330 may be formed from a plastic material according to known molding techniques in one example, although other materials and/or techniques may alternatively be utilized to fabricate the handle 330. Like the handle 106 described above, the handle 330 may be provided with portions having different colors, and may include graphics, symbols, indicia or other features to more clearly convey opened and closed positions to persons such as installers and technicians responsible for establishing, servicing and maintaining an electrical power system. While an exemplary handle 330 is shown having a certain geometric shape and profile, various other geometries and profiles are likewise possible in further and/or alternative embodiments.

Exemplary dimensional values for exemplary embodiments of the switch 300 having different fuse modules 112 and ratings are set forth below in Table 2.

TABLE 2

| Fuse Module Current Rating | Fuse Module Voltage Rating (AC) | Fuse Module Voltage Rating (DC) | Interruption Rating (AC) | Interruption Rating (DC) | $L_2$ | $W_2$ | $D_2$ |
|---|---|---|---|---|---|---|---|
| 30 A | 600 | 250 | 200 kA | 100 kA | 9.5 in | 5 in | 5 in |
| 60 A | 600 | 250 | 200 kA | 100 kA | 9.5 in | 5 in | 5 in |
| 100 A | 600 | 250 | 200 kA | 100 kA | 13 in | 5 in | 6 in |

Thus, smaller yet effective disconnect switches may be realized relative to known disconnect switches having comparable capabilities.

As also shown in the Figures, the enclosure 102 of the switch 200 may include a lockout element 340 extending through the access door 104. The lockout element 340 may receive a shank of a padlock or other device to prevent the door 104 from being opened without being unlocked. The switch 300 is accordingly sometimes referred to as a safety switch.

The benefits and advantages of the exemplary embodiments disclosed are now believed to have been amply illustrated in relation to the exemplary embodiments disclosed.

An embodiment of a disconnect switch has been disclosed including: an enclosure forming an interior cavity; and a fusible switch disconnect assembly mounted to the enclosure in the interior cavity. The fusible switch disconnect assembly includes: a disconnect housing configured to receive at least one overcurrent protection fuse; at least one switch contact selectively positionable in the disconnect housing to open and close a current path through the overcurrent protection fuse; and a rotary switch actuator configured to position the at least one switch contact. The switch further includes a switch mechanism mounted to the enclosure; an actuator guide interfaced with the rotary switch actuator; and a handle associated with the switch mechanism, wherein rotation of the handle operates the switch mechanism and rotates the actuator guide, and wherein rotation of the actuator guide causes the rotary switch actuator to change the position of the at least one switch contact.

Optionally, the disconnect housing is configured to receive at least one rectangular fuse module. The rectangular fuse module may include a rectangular housing having spaced apart terminal blades projecting from a common side of the rectangular housing. The disconnect housing may be configured to receive a plurality of overcurrent protection fuses.

The switch may further include a DIN rail mounted to the enclosure in the interior cavity, with the fusible switch disconnect assembly mounted on the DIN rail. The handle may extend exterior to the enclosure. The handle may be rotatable about an axis parallel to the rotational axis of the rotary switch contact of the fusible disconnect switch assembly, or rotatable about an axis perpendicular to the rotational axis of the rotary switch contact of the fusible disconnect switch assembly.

The switch mechanism may include a first gear and a second gear oriented 90° from the first gear. The switch mechanism may also include a first plate, a second plate and a riser section connecting the first and second plates. The switch mechanism may include a shaft, with the handle attachable to the shaft. The switch mechanism may include a lever, with the handle attachable to the lever.

The actuator guide may form a sleeve, and at least a portion of the rotary switch actuator may extend from the disconnect housing, with the portion of the switch actuator being received in the sleeve. The actuator guide may be rotatably mounted to at least one side of the enclosure.

The enclosure may include at least one knockout portion, and the switch may further include an access door. The handle may be rotatably mounted to the access door. The switch mechanism may be mounted interior to the enclosure, and may include a rotatable shaft, with the rotatable shaft slidably engagable with the handle. The handle may engage the rotatable shaft only when the access door is closed. Alternatively, the switch mechanism is mounted to an exterior of the enclosure.

The disconnect housing may include a plurality of rotary switch actuators each positioning a respective switch contact to connect or disconnect a current path associated with one of a plurality of overcurrent protection fuses, and the actuator guide may be configured to receive the plurality of rotary switch actuators and simultaneously operate the plurality of rotary switch actuators. The fusible switch disconnect assembly may also include a tripping mechanism in the disconnect housing and the tripping mechanism may include a solenoid. The fusible switch disconnect assembly may includes at least one sensor and control circuitry responsive to the sensor to operate the tripping mechanism in response to electrical conditions detected with the sensor. The overcurrent protection fuse may include at least one terminal blade, and the fusible switch disconnect assembly may include an interlock element responsive to a position of the rotary switch actuator and acting upon the terminal blade to prevent removal of the terminal blade. The disconnect housing may define at least one fuse rejection feature.

Another embodiment of a disconnect switch has been disclosed including: an enclosure forming an interior cavity and a fusible switch disconnect assembly mounted to the enclosure in the interior cavity. The fusible switch disconnect assembly includes: a disconnect housing configured to receive at least one retractable rectangular fuse module having a pair of terminal blades extending from a common side of a rectangular housing; line and load side fuse clips in the disconnect housing and configured to receive the terminal blades of the rectangular fuse module; at least one switch contact in the disconnect housing, the at least one switch contact selectively positionable in the disconnect housing to open and close a current path to one of the line and load side terminals; and a rotary switch actuator configured to position the at least one switch contact. The switch also includes a switch mechanism mounted to the enclosure; an actuator guide interfaced with the rotary switch actuator; and a handle associated with the switch mechanism, wherein rotation of the handle operates the switch mechanism and rotates the actuator guide, and wherein rotation of the actuator guide causes the rotary switch actuator to change the position of the at least one switch contact.

Optionally, the disconnect housing is configured to receive a plurality of retractable, rectangular fuse modules. A DIN rail may be mounted to the enclosure in the interior cavity, with the fusible switch disconnect assembly mounted on the DIN rail. The handle may extend exterior to the enclosure. The handle may be rotatable about an axis parallel to the rotational axis of the rotary switch contact of the fusible disconnect switch assembly, or may be is rotatable about an axis perpendicular to the rotational axis of the rotary switch contact of the fusible disconnect switch assembly. The switch mechanism may include a first gear and a second gear oriented 90° from the first gear. The switch mechanism may also include a pivotal lever.

The actuator guide may form a sleeve, and at least a portion of the rotary switch actuator extends from the disconnect housing, with the portion of the switch actuator being received in the sleeve. The actuator guide may be rotatably mounted to at least one side of the enclosure.

The switch may include an access door, with the handle extending on an exterior of the access door. The switch mechanism may be mounted interior to the enclosure, and may include a rotatable shaft, the rotatable shaft slidably engagable with the handle. The handle may engage the rotatable shaft only when the access door is closed. The switch mechanism may alternatively be mounted to an exterior of the enclosure.

The disconnect housing may include a plurality of rotary switch actuators each positioning a respective switch contact to connect or disconnect a current path associated with one of a plurality of retractable rectangular fuse modules, and the actuator guide may be configured to receive the plurality of rotary switch actuators and simultaneously operate the plurality of rotary switch actuators. The disconnect housing may define at least one fuse rejection feature.

Another embodiment of a disconnect switch has been disclosed including an enclosure forming an interior cavity and a fusible switch disconnect assembly mounted to the enclosure in the interior cavity. The fusible switch disconnect assembly includes: a disconnect housing configured to receive a plurality of retractable rectangular fuse modules each having a pair of terminal blades extending from a common side of a rectangular housing; line and load side fuse clips in the disconnect housing and configured to receive the terminal blades of each rectangular fuse module; a plurality of switch contacts in the disconnect housing, each switch contact selectively positionable in the disconnect housing to open and close a respective current path to one of the line and load side terminals; and a plurality of rotary switch actuators configured to position the respective switch contacts. The switch may further include a single switch mechanism mounted to the enclosure; an actuator guide interfaced with the rotary switch actuator; and a single handle associated with the switch mechanism, wherein rotation of the handle operates the switch mechanism and rotates the actuator guide, and wherein rotation of the actuator guide causes the plurality of rotary switch actuators to simultaneously change the position of the switch contacts.

Optionally, the switch may further include a DIN rail mounted to the enclosure in the interior cavity, with the fusible switch disconnect assembly mounted on the DIN rail. The handle may extend exterior to the enclosure, may be rotatable about an axis parallel to the rotational axis of the rotary switch contacts of the fusible disconnect switch assembly, or may be rotatable about an axis perpendicular to the rotational axis of the rotary switch contacts of the fusible disconnect switch assembly.

The switch mechanism may include a first gear and a second gear oriented 90° from the first gear. The switch mechanism may include a pivotal lever. The actuator guide may form a sleeve, and at least a portion of each of the plurality of rotary switch actuators may extend from the disconnect housing, the portions of each switch actuator being received in the sleeve. The actuator guide may be rotatably mounted to at least one side of the enclosure.

The switch may also include an access door, wherein the handle is rotatably mounted to the access door. The switch mechanism may be mounted interior to the enclosure. The switch mechanism may include a rotatable shaft, the rotatable shaft slidably engagable with the handle. The switch mechanism may be mounted to an exterior of the enclosure. The disconnect housing may defines at least one fuse rejection feature.

An embodiment of a disconnect switch for a fusible switch disconnect assembly has also been disclosed. The disconnect assembly includes: a disconnect housing configured to receive a plurality of retractable rectangular fuse modules each including a pair of terminal blades extending from a common side of a rectangular housing, line and load side fuse clips in the disconnect housing and configured to receive the terminal blades of each rectangular fuse module; a plurality of switch contacts in the disconnect housing, each switch contact selectively positionable in the disconnect housing to open and close a respective current path to one of the line and load side terminals; and a plurality of rotary switch actuators configured to position the respective switch contacts. The disconnect switch includes: an enclosure forming an interior cavity; a single switch mechanism mounted to the enclosure; an actuator guide having a first end and second end opposing one another and a sleeve extending between the first and second end, the first end interfaced with the rotary switch actuator and the send end rotatably mounted to the enclosure; and a single handle associated with the switch mechanism, wherein rotation of the handle operates the switch mechanism and rotates the actuator guide; wherein when the fusible switch disconnect assembly is mounted in the interior cavity, rotation of the actuator guide causes the plurality of rotary switch actuators to simultaneously change the position of the switch contacts in the fusible switch disconnect assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A disconnect switch comprising:
   an enclosure forming an interior cavity;
   a fusible switch disconnect assembly mounted to the enclosure in the interior cavity, the fusible switch disconnect assembly comprising:
      a disconnect housing sized and shaped to receive at least one overcurrent protection fuse;
      at least one switch contact enclosed in the disconnect housing and selectively positionable relative to the disconnect housing to open and close a current path through the at least one overcurrent protection fuse; and
      a rotary switch actuator coupled to the at least one switch contact, wherein a portion of the rotary switch actuator projects from an upper surface of the disconnect housing; and
   a switch mechanism mounted to the enclosure;
   an actuator guide interfaced with the portion of the rotary switch actuator; and
   a handle associated with the switch mechanism, wherein rotation of the handle operates the switch mechanism and rotates the actuator guide, and wherein rotation of the actuator guide causes the portion of the rotary switch actuator to rotate and change the position of the at least one switch contact to open or close the current path through the at least one overcurrent protection fuse.

2. The disconnect switch of claim 1, wherein the disconnect housing is sized and shaped to receive at least one rectangular fuse module.

3. The disconnect switch of claim 2, wherein the rectangular fuse module includes a rectangular housing having spaced apart terminal blades projecting from a common side of the rectangular housing.

4. The disconnect switch of claim 1, wherein the disconnect housing is sized and shaped to receive a plurality of overcurrent protection fuses.

5. The disconnect switch of claim 1, further comprising a DIN rail mounted to the enclosure in the interior cavity, the fusible switch disconnect assembly mounted on the DIN rail.

6. The disconnect switch of claim 1, wherein the handle extends exterior to the enclosure.

7. The disconnect switch of claim 1, wherein the handle is rotatable about an axis parallel to the rotational axis of the rotary switch actuator of the fusible disconnect switch assembly.

8. The disconnect switch of claim 1, wherein the handle is rotatable about an axis perpendicular to the rotational axis of the rotary switch actuator of the fusible disconnect switch assembly.

9. The disconnect switch of claim 1, wherein the switch mechanism includes a first gear and a second gear oriented 90° from the first gear.

10. The disconnect switch of claim 1, wherein the switch mechanism includes a first plate, a second plate and a riser section connecting the first and second plates.

11. The disconnect switch of claim 1, wherein the switch mechanism includes a shaft, the handle being detachable from the shaft.

12. The disconnect switch of claim 1, wherein the switch mechanism includes a lever, the handle attached to the lever.

13. The disconnect switch of claim 1, wherein the actuator guide forms a sleeve, and wherein the portion of the rotary switch actuator is received in the sleeve.

14. The disconnect switch of claim 1, wherein the actuator guide is rotatably mounted to at least one side of the enclosure.

15. The disconnect switch of claim 1, wherein the enclosure includes at least one knockout portion.

16. The disconnect switch of claim 1, further comprising an access door.

17. The disconnect switch of claim 16, wherein the handle is rotatably mounted to the access door.

18. The disconnect switch of claim 1, wherein the switch mechanism is mounted interior to the enclosure.

19. The disconnect switch of claim 1, wherein the switch mechanism includes a rotatable shaft, the rotatable shaft slidably engaging and disengaging the handle.

20. The disconnect switch of claim 19, further comprising an access door, the handle engaging the rotatable shaft only when the access door is closed.

21. The disconnect switch of claim 1, wherein the switch mechanism is mounted to an exterior of the enclosure.

22. The disconnect switch of claim 1, wherein the disconnect housing includes a plurality of rotary switch actuators each positioning a respective switch contact to connect or disconnect a current path associated with one of a plurality of overcurrent protection fuses, and the actuator guide receiving a portion of each of the plurality of rotary switch actuators and simultaneously operating the plurality of rotary switch actuators when the actuator guide is moved.

23. The disconnect switch of claim 1, wherein the fusible switch disconnect assembly further includes a tripping mechanism enclosed in the disconnect housing.

24. The disconnect switch of claim 23, wherein the tripping mechanism includes a solenoid.

25. The disconnect switch of claim 23, wherein the fusible switch disconnect assembly further includes at least one sensor and control circuitry enclosed in the disconnect housing, the control circuitry responsive to the at least one sensor to operate the tripping mechanism in response to electrical conditions detected with the at least one sensor.

26. The disconnect switch of claim 1, wherein the overcurrent protection fuse includes at least one terminal blade, and the fusible switch disconnect assembly including an interlock element responsive to a position of the rotary switch actuator and acting upon the terminal blade to prevent removal of the terminal blade.

27. The disconnect switch of claim 1, wherein the disconnect housing defines at least one fuse rejection feature.

28. A disconnect switch comprising:
   an enclosure forming an interior cavity;
   a fusible switch disconnect assembly mounted to the enclosure in the interior cavity, the fusible switch disconnect assembly comprising:
      a disconnect housing sized and shaped to receive and engage at least one retractable rectangular fuse module having a pair of terminal blades extending from a common side of a rectangular housing;
      line and load side fuse clips enclosed in the disconnect housing and receiving the terminal blades of the rectangular fuse module when the rectangular fuse module is engaged;
      at least one switch contact enclosed in the disconnect housing, the at least one switch contact selectively positionable in the disconnect housing to open and close a current path to one of the line and load side fuse clips; and
      a rotary switch actuator mechanically linked to the at least one switch contact, wherein a portion of the rotary switch actuator projects from an upper portion of the disconnect housing;

a switch mechanism mounted to the enclosure;
an actuator guide interfaced with a portion of the rotary switch actuator; and
a handle associated with the switch mechanism, wherein rotation of the handle operates the switch mechanism and rotates the actuator guide, and wherein rotation of the actuator guide causes the rotary switch actuator to change the position of the at least one switch contact.

29. The disconnect switch of claim 28, wherein the disconnect housing is sized and shaped to receive a plurality of retractable, rectangular fuse modules.

30. The disconnect switch of claim 28, further comprising a DIN rail mounted to the enclosure in the interior cavity, the fusible switch disconnect assembly mounted on the DIN rail.

31. The disconnect switch of claim 28, wherein the handle extends exterior to the enclosure.

32. The disconnect switch of claim 28, wherein the handle is rotatable about an axis parallel to the rotational axis of the rotary switch actuator of the fusible disconnect switch assembly.

33. The disconnect switch of claim 28, wherein the handle is rotatable about an axis perpendicular to the rotational axis of the rotary switch actuator of the fusible disconnect switch assembly.

34. The disconnect switch of claim 28, wherein the switch mechanism includes a first gear and a second gear oriented 90° from the first gear.

35. The disconnect switch of claim 28, wherein the switch mechanism includes a pivotal lever.

36. The disconnect switch of claim 28, wherein the actuator guide forms a sleeve, and wherein at least a portion of the rotary switch actuator extends from the disconnect housing, the portion of the switch actuator being received in the sleeve.

37. The disconnect switch of claim 28, wherein the actuator guide is rotatably mounted to at least one side of the enclosure.

38. The disconnect switch of claim 28, further comprising an access door, wherein the handle extends on an exterior of the access door.

39. The disconnect switch of claim 28, wherein the switch mechanism is mounted interior to the enclosure.

40. The disconnect switch of claim 28, wherein the switch mechanism includes a rotatable shaft, the rotatable shaft slidably engaged and disengaged with the handle.

41. The disconnect switch of claim 40, further comprising an access door, the handle engaging the rotatable shaft only when the access door is closed.

42. The disconnect switch of claim 28, wherein the switch mechanism is mounted to an exterior of the enclosure.

43. The disconnect switch of claim 28, wherein the disconnect housing includes a plurality of rotary switch actuators each positioning a respective switch contact to connect or disconnect a current path associated with one of a plurality of retractable rectangular fuse modules, and the actuator guide receives the plurality of rotary switch actuators and simultaneously operates the plurality of rotary switch actuators.

44. The disconnect switch of claim 28, wherein the disconnect housing defines at least one fuse rejection feature.

45. A disconnect switch comprising:
an enclosure forming an interior cavity;
a fusible switch disconnect assembly mounted to the enclosure in the interior cavity, the fusible switch disconnect assembly comprising:
a disconnect housing sized and shaped to receive and engage a plurality of retractable rectangular fuse modules each respectively having a pair of terminal blades extending from a common side of a rectangular housing;
a plurality of line and load side fuse clips enclosed in the disconnect housing and respectively receiving one of the pair of terminal blades when the plurality of rectangular fuse modules are engaged;
a plurality of line side terminals connected to each respective one of the line side fuse clips;
a plurality of switch contacts enclosed in the disconnect housing, each switch contact selectively positionable in the disconnect housing to open and close a respective current path through the respective one of the plurality of line side terminals; and
a plurality of rotary switch actuators each respectively mechanically linked with a respective one of the plurality of switch contacts;
a single switch mechanism mounted to the enclosure;
an actuator guide interfaced with each of the plurality of rotary switch actuators; and
a single handle associated with the single switch mechanism, wherein rotation of the single handle operates the single switch mechanism and rotates the actuator guide, and wherein rotation of the actuator guide causes the plurality of rotary switch actuators to simultaneously change the position of the plurality of switch contacts.

46. The disconnect switch of claim 45, further comprising a DIN rail mounted to the enclosure in the interior cavity, the fusible switch disconnect assembly mounted on the DIN rail.

47. The disconnect switch of claim 45, wherein the single handle extends exterior to the enclosure.

48. The disconnect switch of claim 45, wherein the single handle is rotatable about an axis parallel to the rotational axis of the plurality of rotary switch actuators of the fusible disconnect switch assembly.

49. The disconnect switch of claim 45, wherein the single handle is rotatable about an axis perpendicular to the rotational axis of the plurality of rotary switch actuators of the fusible disconnect switch assembly.

50. The disconnect switch of claim 45, wherein the single switch mechanism includes a first gear and a second gear oriented 90° from the first gear.

51. The disconnect switch of claim 45, wherein the single switch mechanism includes a pivotal lever.

52. The disconnect switch of claim 45, wherein the actuator guide forms a sleeve, and wherein at least a portion of each of the plurality of rotary switch actuators extends from the disconnect housing, the portions of each of the plurality of switch actuators being received in the sleeve.

53. The disconnect switch of claim 45, wherein the actuator guide is rotatably mounted to at least one side of the enclosure.

54. The disconnect switch of claim 45, further comprising an access door, wherein the single handle is rotatably mounted to the access door.

55. The disconnect switch of claim 45, wherein the single switch mechanism is mounted interior to the enclosure.

56. The disconnect switch of claim 45, wherein the single switch mechanism includes a rotatable shaft, the rotatable shaft slidably engaging and disengaging the handle.

57. The disconnect switch of claim 45, wherein the single switch mechanism is mounted to an exterior of the enclosure.

58. The disconnect switch of claim 45, wherein the disconnect housing defines at least one fuse rejection feature.

59. A disconnect switch for a fusible switch disconnect assembly including: at least one disconnect housing sized and shaped to receive a plurality of retractable rectangular fuse modules each including a pair of terminal blades extending from a common side of a rectangular housing, line and load side fuse clips in the disconnect housing and receiving the terminal blades of each rectangular fuse module; line and load side terminals respectively connected to the line and load side fuse clips; a plurality of switch contacts in the disconnect housing, each switch contact selectively positionable in the disconnect housing to open and close a respective current path to one of the line and load side terminals; and a plurality of rotary switch actuators mechanically coupled to the respective switch contacts; the disconnect switch including:

an enclosure forming an interior cavity;

a single switch mechanism mounted to the enclosure;

an actuator guide having a first end and second end opposing one another and a sleeve extending between the first and second end, the sleeve simultaneously interfacing with each of the plurality of rotary switch actuators when the fusible switch disconnect assembly is mounted in the interior cavity and the second end rotatably mounted to the enclosure; and a single handle associated with the single switch mechanism, wherein rotation of the single handle operates the single switch mechanism and rotates the actuator guide; and wherein rotation of the actuator guide causes the plurality of rotary switch actuators to simultaneously change the position of the switch contacts in the fusible switch disconnect assembly when the fusible switch disconnect assembly is mounted in the interior cavity.

60. A disconnect switch comprising:

an enclosure forming an interior cavity;

a fusible switch disconnect assembly mounted to the enclosure in the interior cavity, the fusible switch disconnect assembly comprising:

a disconnect housing sized and shaped to receive at least one overcurrent protection fuse;

at least one switch contact selectively positionable in the disconnect housing to open and close a current path through the at least one overcurrent protection fuse; and a rotary switch actuator coupled to the at least one switch contact; and a switch mechanism mounted to the enclosure;

an actuator guide interfaced with the rotary switch actuator; and a handle associated with the switch mechanism, wherein rotation of the handle operates the switch mechanism and rotates the actuator guide, and wherein rotation of the actuator guide causes the rotary switch actuator to change the position of the at least one switch contact;

wherein the overcurrent protection fuse includes at least one terminal blade, and the fusible switch disconnect assembly includes an interlock element responsive to a position of the rotary switch actuator and acting upon the terminal blade to prevent removal of the terminal blade.

61. A disconnect assembly comprising:

an enclosure forming an interior cavity dimensioned to contain a plurality of retractable rectangular fuse modules including a plurality of switch contacts selectively positionable to open and close a respective current path associated with each of the rectangular fuse modules, and a plurality of rotary switch actuators respectively linked to the different ones of the plurality of switch contacts;

a single switch mechanism mounted to the enclosure;

an actuator guide having opposing first and second ends and an elongated sleeve extending between the first and second end, the elongated sleeve simultaneously receiving a portion of each of the plurality of rotary switch actuators and the second end rotatably mounted to the enclosure and coupled to the single switch mechanism; and a single handle associated with the single switch mechanism, wherein rotation of the single handle operates the single switch mechanism and causes the elongated sleeve to rotate, whereby rotation of the elongated sleeve causes the plurality of rotary switch actuators to simultaneously rotate.

* * * * *